(12) United States Patent
Chen et al.

(10) Patent No.: US 11,218,913 B2
(45) Date of Patent: Jan. 4, 2022

(54) AIR-INTERFACE PROTOCOL STACK CONFIGURATION METHOD, DATA TRANSMISSION METHOD, AIR-INTERFACE PROTOCOL STACK CONFIGURATION DEVICE, AND DATA TRANSMISSION DEVICE

(71) Applicant: CHINA ACADEMY OF TELECOMMUNICATIONS TECHNOLOGY, Beijing (CN)

(72) Inventors: Li Chen, Beijing (CN); Bin Jiao, Beijing (CN); Fei Qin, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 4 days.

(21) Appl. No.: 15/555,962

(22) PCT Filed: Feb. 3, 2016

(86) PCT No.: PCT/CN2016/073355
§ 371 (c)(1),
(2) Date: Sep. 5, 2017

(87) PCT Pub. No.: WO2016/141793
PCT Pub. Date: Sep. 15, 2016

(65) Prior Publication Data
US 2018/0041922 A1 Feb. 8, 2018

(30) Foreign Application Priority Data
Mar. 6, 2015 (CN) .......................... 201510100634.9

(51) Int. Cl.
*H04W 28/18* (2009.01)
*H04W 28/06* (2009.01)
*H04W 80/02* (2009.01)

(52) U.S. Cl.
CPC .......... *H04W 28/18* (2013.01); *H04W 28/06* (2013.01); *H04W 80/02* (2013.01)

(58) Field of Classification Search
CPC ..... H04W 28/18; H04W 28/06; H04W 80/02; H04W 84/18; H04W 40/24; H04W 48/16;
(Continued)

(56) References Cited

U.S. PATENT DOCUMENTS

| 8,385,216 B1 * | 2/2013 | Shetty | H04W 36/14 370/252 |
| 10,652,764 B2 * | 5/2020 | Luo | H04W 92/20 |

(Continued)

FOREIGN PATENT DOCUMENTS

| CN | 1402494 A | 3/2003 |
| CN | 1992957 A | 7/2007 |

(Continued)

OTHER PUBLICATIONS

International Search Report for PCT/CN2016/073355, dated Apr. 27, 2016, and its English translation provided by WIPO.
(Continued)

*Primary Examiner* — Ian N Moore
*Assistant Examiner* — Latresa A McCallum
(74) *Attorney, Agent, or Firm* — Ladas & Parry, LLP

(57) ABSTRACT

The present disclosure provides an air-interface protocol stack configuration method, a data transmission method, an air-interface protocol stack configuration device and a data transmission device. The air-interface protocol stack configuration method includes steps of: configuring an air-interface protocol stack to be used for data transmission in accordance with data transmission characteristics of communication ends for the data transmission; and transmitting configuration information or identification information
(Continued)

```
                                        ╱── 500
┌─────────────────────────────────────────────────────────────────┐
│ configuring an air-interface protocol stack to be used for data │
│ transmission in accordance with data transmission characteristics│
│ of communication ends for the data transmission                 │
└─────────────────────────────────────────────────────────────────┘
                              │
                              ▼
                                        ╱── 510
┌─────────────────────────────────────────────────────────────────┐
│ transmitting configuration information or identification        │
│ information about the air-interface protocol stack to at least  │
│ one of the communication ends for the data transmission         │
└─────────────────────────────────────────────────────────────────┘
``` about the air-interface protocol stack to at least one of the communication ends for the data transmission.

12 Claims, 7 Drawing Sheets

(58) Field of Classification Search
CPC ..... H04W 16/00; H04W 66/06; H04W 72/12; H04W 8/20; H04W 36/0072; H04L 29/08648; H04L 29/0899; H04L 41/5058; H04L 1/0001; H04L 5/00; H04B 7/024
See application file for complete search history.

(56) References Cited

U.S. PATENT DOCUMENTS

| | | | | |
|---|---|---|---|---|
| 2002/0062394 | A1* | 5/2002 | Bunn | H03M 7/30 |
| | | | | 709/246 |
| 2002/0099858 | A1 | 7/2002 | Lindo et al. | |
| 2006/0133409 | A1 | 6/2006 | Prakash et al. | |
| 2006/0164981 | A1* | 7/2006 | Olsson | H04L 1/1854 |
| | | | | 370/229 |
| 2009/0238129 | A1* | 9/2009 | Park | H04W 76/22 |
| | | | | 370/329 |
| 2010/0124191 | A1 | 5/2010 | Vos et al. | |
| 2012/0039245 | A1* | 2/2012 | Wang | H04B 7/155 |
| | | | | 370/315 |
| 2012/0127941 | A1* | 5/2012 | Li | H04W 88/08 |
| | | | | 370/329 |
| 2013/0070681 | A1* | 3/2013 | Lee | H04L 1/1825 |
| | | | | 370/328 |
| 2014/0301281 | A1* | 10/2014 | Koskinen | H04L 5/0064 |
| | | | | 370/329 |
| 2015/0016367 | A1* | 1/2015 | Koskinen | H04L 5/001 |
| | | | | 370/329 |
| 2015/0156669 | A1* | 6/2015 | Quan | H04L 69/321 |
| | | | | 370/216 |
| 2015/0289179 | A1 | 10/2015 | Liu et al. | |
| 2015/0334703 | A1* | 11/2015 | Xu | H04L 1/0002 |
| | | | | 370/253 |
| 2016/0057585 | A1* | 2/2016 | Horn | H04W 80/02 |
| | | | | 370/312 |
| 2016/0241680 | A1* | 8/2016 | Cho | H04L 69/323 |

FOREIGN PATENT DOCUMENTS

| | | |
|---|---|---|
| CN | 101931931 A | 12/2010 |
| CN | 101969635 | 2/2011 |
| CN | 102149115 A | 8/2011 |
| CN | 102158901 A | 8/2011 |
| WO | 2014032502 A1 | 3/2014 |

OTHER PUBLICATIONS

Written Opinion of the International Search Authority for PCT/CN2016/073355, dated Apr. 27, 2016, and its English translation provided by Bing.Com Microsoft Translate.
1st Office Action for CN2011139049.4 dated Mar. 5, 2013, with a translation provided by Espacenet Global Dossier.
2nd Office Action for CN2011139049.4 dated Aug. 2, 2013, with a translation provided by Espacenet Global Dossier.
Search Report for CN2011139049.4 dated Feb. 25, 2013.
International Preliminary Report on Patentability (IPRP; Ch. 1) for PCT/CN2016/073355, dated Sep. 21, 2017, and its English translation provided by WIPO.
Written Opinion of the International Search Authority for PCT/CN2016/073355, dated Apr. 27, 2016, and its English translation provided by WIPO.
From EPO 1676102.3, Extended European Search Report and Search Opinion dated Feb. 13, 2018.

* cited by examiner

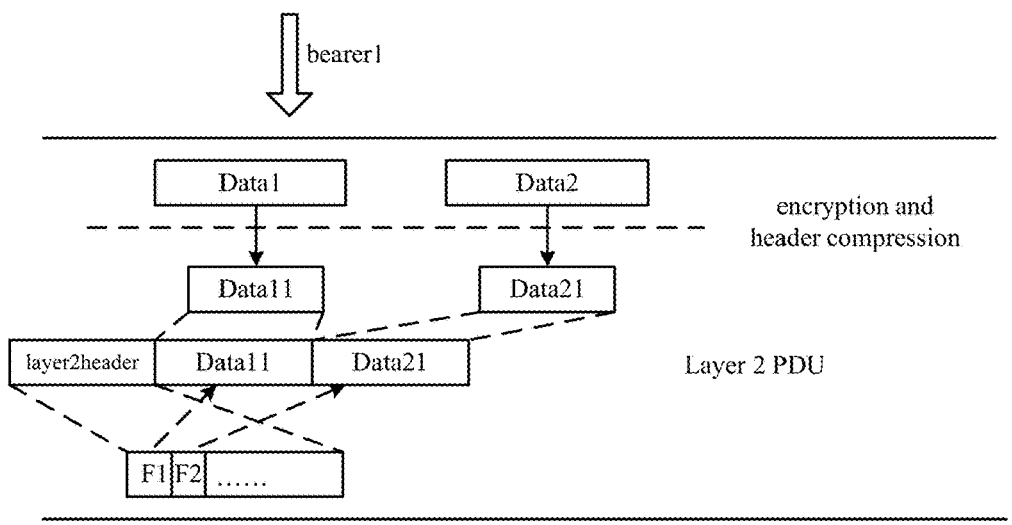

Fig.3

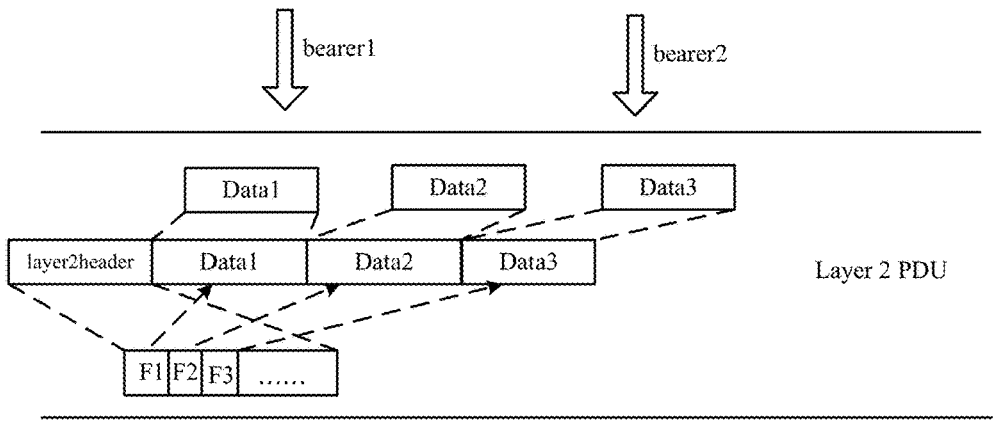

Fig.4

500
configuring an air-interface protocol stack to be used for data transmission in accordance with data transmission characteristics of communication ends for the data transmission 510
transmitting configuration information or identification information about the air-interface protocol stack to at least one of the communication ends for the data transmission

Fig.5 ations.
AIR-INTERFACE PROTOCOL STACK CONFIGURATION METHOD, DATA TRANSMISSION METHOD, AIR-INTERFACE PROTOCOL STACK CONFIGURATION DEVICE, AND DATA TRANSMISSION DEVICE

CROSS-REFERENCE TO RELATED APPLICATIONS

The present application is the U.S. national phase of PCT Application No. PCT/CN2016/073355 filed on Feb. 3, 2016, which claims priority to the Chinese patent application No. 201510100634.9 filed on Mar. 6, 2015, the disclosures of which are incorporated herein by reference in their entireties.

TECHNICAL FIELD

The present disclosure relates to the field of wireless communication technology, in particular to an air-interface protocol stack configuration method, a data transmission method, an air-interface protocol stack configuration device, and a data transmission device.

BACKGROUND

A fixed protocol stack structure is adopted by a conventional wireless transmission technique, and data needs to be added with a corresponding data head for each protocol layer, so as to be identified by different protocol layers.

Taking a Long Term Evolution (LTE) system as an example, a basic transmission procedure of a user side data stream will be described as follows. A layer 2 of an air interface user side 2 includes a Packet Data Convergence Protocol (PDCP) layer, a Radio Link Control (RLC) layer and a Media Access Control (MAC) layer. A data packet processed by the layer 2 is transmitted by a transmitting end to a layer 1 (physical layer), and then encoded and modulated at the physical layer 1 into a bit stream to be transmitted through an air interface. The PDCP layer has a header compression function and an encryption function, and after the header compression and encryption by the transmitting end, an Internet Protocol (IP) data packet is taken as a PDCP Service Data unit (SDU), which is added with a PDCP header so as to form a PDCP Protocol Data Unit (PDU) transmitted to the RLC layer. The RLC layer has a segmentation function and a cascading function. At the RLC layer, the PDCP PDU becomes an RLC SDU. The RLC layer may group a plurality of RLC SDUs into one RLC PDU, or segment one RLC SDU into a plurality of RLC PDUs. The MAC layer has a multiplexing function, and it may cascade the RLC PDUs (also called as MAC SDUs for the MAC layer) from a plurality of bearers into one MAC PDU. The MAC PDU is then transmitted to the physical layer where a Cyclic Redundancy Check (CRC) addition and any other physical layer modulation and encoding treatment are performed, so as to generate a transmission block to be transmitted through the air interface. Upon the receipt of the bit stream from the physical layer, a receiving end may parse the IP data packet in a process reverse to that mentioned above.

Due to a hierarchical modular design, architecture of an LTE air-interface protocol stack is generic to various service data, but it is impossible to meet the transmission requirements of a terminal having a specific data transmission characteristic, so data transmission performance of the terminal having the specific data transmission characteristic may be degraded.

SUMMARY

An object of the present disclosure is to provide an air-interface protocol stack configuration method, a data transmission method, an air-interface protocol stack configuration device, and a data transmission device, so as to prevent the data transmission performance from being degraded in the case that the data transmission is performed by the terminal having the specific data transmission characteristic using the architecture of the conventional LTE air-interface protocol stack.

In one aspect, the present disclosure provides in some embodiments an air-interface protocol stack configuration method, including steps of: configuring an air-interface protocol stack to be used for data transmission in accordance with data transmission characteristics of communication ends for the data transmission; and transmitting configuration information or identification information about the air-interface protocol stack to at least one of the communication ends for the data transmission.

In a possible embodiment of the present disclosure, the data transmission characteristics of the communication ends for the data transmission include parts or all of the followings: a service type of the data transmission, a data volume type of the data transmission, a type of at least one of the communication ends for the data transmission, a capability of at least one of the communication ends for the data transmission, and an application scenario of the data transmission.

In a possible embodiment of the present disclosure, the step of configuring the air-interface protocol stack to be used for the data transmission in accordance with the data transmission characteristics of the communication ends for the data transmission includes: configuring, for a communication end at a specific region, the air-interface protocol stack to be used for the data transmission in accordance with the data transmission characteristics of the communication ends for the data transmission; or configuring, for a specific communication end, the air-interface protocol stack to be used for the data transmission in accordance with the data transmission characteristics of the communication ends for the data transmission; or configuring the air-interface protocol stack to be used for the data transmission in accordance with the data transmission characteristics reported by at least one of the communication ends for the data transmission; or selecting an air-interface protocol stack from a plurality of predetermined air-interface protocol stacks as the air-interface protocol stack to be used for the data transmission in accordance with a correspondence between predetermined data transmission characteristics and air-interface protocol stack configurations.

In a possible embodiment of the present disclosure, the step of configuring the air-interface protocol stack to be used for the data transmission in accordance with the data transmission characteristics of the communication ends for the data transmission includes configuring air-interface protocol layers to be used for the data transmission and/or functions of the respective air-interface protocol layers in accordance with the data transmission characteristics of the communication ends for the data transmission.

In a possible embodiment of the present disclosure, the configuration information about the air-interface protocol stack includes: configuration information about the air-interface protocol layers to be used for the data transmission with an opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In another aspect, the present disclosure provides in some embodiments a data transmission method, including steps of: acquiring an air-interface protocol stack to be used for data transmission with an opposite communication end, the air-interface protocol stack being configured in accordance with data transmission characteristics for the data transmission with the opposite communication end; and performing the data transmission with the opposite communication end in accordance with the air-interface protocol stack.

In a possible embodiment of the present disclosure, the data transmission characteristics for the data transmission with the opposite communication end includes parts or all of the followings: a service type of the data transmission with the opposite communication end, a data volume type of the data transmission with the opposite communication end, a type of the opposite communication end, a type of a current device, a capability of the opposite communication end, a capability of the current device, and an application scenario of the data transmission with the opposite communication end.

In a possible embodiment of the present disclosure, the step of acquiring the air-interface protocol stack to be used for the data transmission with the opposite communication end includes: acquiring the air-interface protocol stack to be used for the data transmission with an opposite communication end at a specific region; or acquiring the air-interface protocol stack to be used for the data transmission with a specific communication end; or acquiring the air-interface protocol stack to be used for the data transmission with the opposite communication end in accordance with the data transmission characteristics reported by the opposite communication end; or selecting the air-interface protocol stack to be used for the data transmission with the opposite communication end from a plurality of predetermined air-interface protocol stacks in accordance with a correspondence between predetermined data transmission characteristics and air-interface protocol stack configurations.

In a possible embodiment of the present disclosure, the step of acquiring the air-interface protocol stack to be used for the data transmission with the opposite communication end includes acquiring air-interface protocol layers to be used for the data transmission with the opposite communication end and functions of the respective air-interface protocol layers.

In a possible embodiment of the present disclosure, the step of acquiring the air-interface protocol stack to be used for the data transmission with the opposite communication end includes: configuring the air-interface protocol stack to be used for the data transmission with the opposite communication end; or receiving configuration information or identification information about the air-interface protocol stack to be used for the data transmission with the opposite communication end, and acquiring the air-interface protocol stack to be used for the data transmission with the opposite communication end in accordance with the configuration information or identification information.

In a possible embodiment of the present disclosure, the configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In a possible embodiment of the present disclosure, prior to the step of performing the data transmission with the opposite communication end in accordance with the air-interface protocol stack, the data transmission method further includes transmitting the acquired configuration information or identification information about the air-interface protocol stack to the opposite communication end.

In yet another aspect, the present disclosure provides in some embodiments an air-interface protocol stack configuration device, including: an air-interface protocol stack configuration module configured to configure an air-interface protocol stack to be used for data transmission in accordance with data transmission characteristics of communication ends for the data transmission; and an air-interface protocol stack configuration transmission module configured to transmit configuration information or identification information about the air-interface protocol stack to at least one of the communication ends for the data transmission.

In a possible embodiment of the present disclosure, the data transmission characteristics of the communication ends for the data transmission include parts or all of the followings: a service type of the data transmission, a data volume type of the data transmission, a type of at least one of the communication ends for the data transmission, a capability of at least one of the communication ends for the data transmission, and an application scenario of the data transmission.

In a possible embodiment of the present disclosure, the air-interface protocol stack configuration module is configured to: configure, for a communication end at a specific region, the air-interface protocol stack to be used for the data transmission in accordance with the data transmission characteristics of the communication ends for the data transmission; or configure, for a specific communication end, the air-interface protocol stack to be used for the data transmission in accordance with the data transmission characteristics of the communication ends for the data transmission; or configure the air-interface protocol stack to be used for the data transmission in accordance with the data transmission characteristics reported by at least one of the communication ends for the data transmission; or select an air-interface protocol stack from a plurality of predetermined air-interface protocol stacks as the air-interface protocol stack to be used for the data transmission in accordance with a correspondence between predetermined data transmission characteristics and air-interface protocol stack configurations.

In a possible embodiment of the present disclosure, the air-interface protocol stack configuration module is configured to configure air-interface protocol layers to be used for the data transmission and/or functions of the respective air-interface protocol layers in accordance with the data transmission characteristics of the communication ends for the data transmission.

In a possible embodiment of the present disclosure, the configuration information about the air-interface protocol stack includes: configuration information about the air-interface protocol layers to be used for the data transmission with an opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In still yet another aspect, the present disclosure provides in some embodiments a data transmission device, including: an air-interface protocol stack acquisition module configured to acquire an air-interface protocol stack to be used for data transmission with an opposite communication end, the air-interface protocol stack being configured in accordance with data transmission characteristics for the data transmission with the opposite communication end; and a data transmission module configured to perform the data transmission with the opposite communication end in accordance with the air-interface protocol stack.

In a possible embodiment of the present disclosure, the data transmission characteristics for the data transmission with the opposite communication end includes parts or all of the followings: a service type of the data transmission with the opposite communication end, a data volume type of the data transmission with the opposite communication end, a type of the opposite communication end, a type of the data transmission device, a capability of the opposite communication end, a capability of the data transmission device, and an application scenario of the data transmission with the opposite communication end.

In a possible embodiment of the present disclosure, the air-interface protocol stack acquisition module is further configured to: acquire the air-interface protocol stack to be used for the data transmission with an opposite communication end at a specific region; or acquire the air-interface protocol stack to be used for the data transmission with a specific communication end; or acquire the air-interface protocol stack to be used for the data transmission with the opposite communication end in accordance with the data transmission characteristics reported by the opposite communication end; or select the air-interface protocol stack to be used for the data transmission with the opposite communication end from a plurality of predetermined air-interface protocol stacks in accordance with a correspondence between predetermined data transmission characteristics and air-interface protocol stack configurations.

In a possible embodiment of the present disclosure, the air-interface protocol stack acquisition module is further configured to acquire air-interface protocol layers to be used for the data transmission with the opposite communication end and functions of the respective air-interface protocol layers.

In a possible embodiment of the present disclosure, the air-interface protocol stack acquisition module is further configured to: configure the air-interface protocol stack to be used for the data transmission with the opposite communication end; or receive configuration information or identification information about the air-interface protocol stack to be used for the data transmission with the opposite communication end, and acquire the air-interface protocol stack to be used for the data transmission with the opposite communication end in accordance with the configuration information or identification information.

In a possible embodiment of the present disclosure, the configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In a possible embodiment of the present disclosure, the data transmission device further includes an air-interface protocol stack notification module configured to transmit the acquired configuration information or identification information about the air-interface protocol stack to the opposite communication end.

In still yet another aspect, the present disclosure provides in some embodiments a data transmission device, including a processor, a transceiver and a memory. The processor is configured to read a program stored in the memory, so as to: acquire an air-interface protocol stack to be used for data transmission with an opposite communication end, the air-interface protocol stack being configured in accordance with data transmission characteristics for the data transmission with the opposite communication end; and perform, through the transceiver, the data transmission with the opposite communication end in accordance with the air-interface protocol stack. The transceiver is configured to receive and transmit data. The memory is configured to store therein data for the operation of the processor.

In still yet another aspect, the present disclosure provides in some embodiments an air-interface protocol stack configuration device, including a processor, a transceiver and a memory. The processor is configured to read a program stored in the memory, so as to: configure an air-interface protocol stack to be used for data transmission in accordance with data transmission characteristics of communication ends for the data transmission; and transmit, through the transceiver, configuration information or identification information about the air-interface protocol stack to at least one of the communication ends for the data transmission. The transceiver is configured to receive and transmit data. The memory is configured to store therein data for the operation of the processor.

In a possible embodiment of the present disclosure, the air-interface protocol stack configuration device is a core network device, a base station, or a decision node in a self-organizing network or Device-to-Device (D2D) communication.

According to the embodiments of the present disclosure, the air-interface protocol stack to be used for the data transmission may be configured in accordance with the data transmission characteristics for the data transmission, rather than a fixed protocol stack structure. As a result, it is able to

BRIEF DESCRIPTION OF THE DRAWINGS

FIG. 3 is another schematic view showing the organization mode of the air-interface high-layer data according to one embodiment of the present disclosure;

FIG. 4 is yet another schematic view showing the organization mode of the air-interface high-layer data according to one embodiment of the present disclosure;

FIG. 5 is a flow chart of an air-interface protocol stack configuration method according to one embodiment of the present disclosure;

DETAILED DESCRIPTION OF THE EMBODIMENTS

According to the embodiments of the present disclosure, an air-interface protocol stack to be used for data transmission may be configured in accordance with data transmission characteristics for the data transmission. As a result, it is able to meet the data transmission requirements in a flexible manner, thereby to improve the data transmission performance.

The scheme in the embodiments of the present disclosure may be applied to a wide range. For example, it may be applied to communication networks of different types (including a cellular network (e.g., an LTE network), a Wireless Local Area Network (WLAN) and a self-organizing network), or D2D communication. In addition, it may be applied to different application scenarios, e.g., Internet of Vehicle, or Machine Type Communication for industrial automatic control, telemedicine and smart grid.

The data transmission characteristics may include parts or all of the followings: a service type of the data transmission, a data volume type of the data transmission, a type of at least one communication end for the data transmission, a capability of at least one communication end for the data transmission, and an application scenario of the data transmission. The data volume type indicates a data volume, and the application scenario of the data transmission includes, for example, a factory scenario, an Internet of Vehicle scenario or a hospital scenario.

The present disclosure will be described hereinafter in conjunction with the drawings and embodiments.

Figure 1:
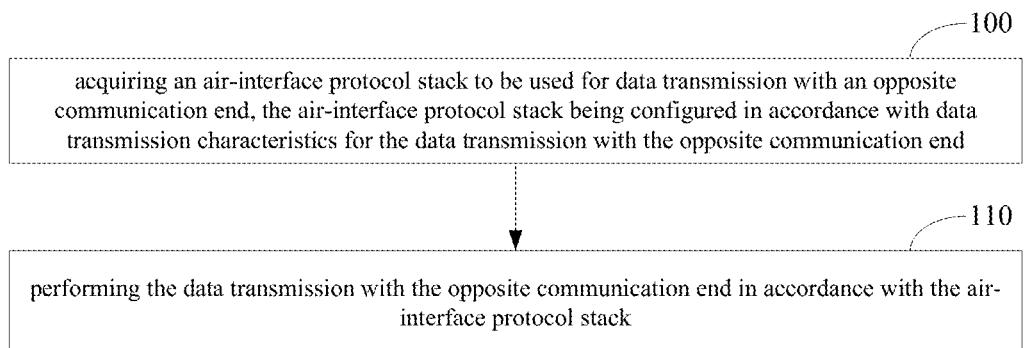
FIG. 1 is a flow chart of a data transmission method according to one embodiment of the present disclosure.

As shown in FIG. 1, the present disclosure provides in some embodiments a data transmission method, including: Step 100 of acquiring an air-interface protocol stack to be used for data transmission with an opposite communication end, the air-interface protocol stack being configured in accordance with data transmission characteristics for the data transmission with the opposite communication end; and Step 110 of performing the data transmission with the opposite communication end in accordance with the air-interface protocol stack.

The data transmission method in FIG. 1 may be implemented by a network side device for a communication network such as a cellular network and a WLAN network, e.g., a base station in the cellular network, or an access point in the WLAN network. Correspondingly, the opposite communication end in communication with the network side device may be a terminal. The type of at least one communication end for the data transmission refers to a type of the terminal, and the capability of at least one communication end for the data transmission refers to a capability of the terminal. It should be appreciated that, the opposite communication end in communication with the network side device may also be another network side device, and at this time, the type of at least one communication end for the data transmission in the data transmission characteristics refers to a type of the current network side device and/or the network side device as the opposite communication end, and the capability of at least one communication end for the data transmission refers to a capability of the current network side device and/or the network side device as the opposite communication end.

The data transmission method in FIG. 1 may also be implemented by a terminal for a cellular network, a WLAN network, a self-organizing network or D2D communication. Correspondingly, the opposite communication end in communication with the terminal may be a network side device (e.g., a base station or an access point), or any other terminal. At this time, the type of at least one communication end for the data transmission in the data transmission characteristics refers to a type of the current terminal (if the opposite communication end is another terminal, it refers to a type of the current terminal and/or the opposite communication terminal), and the capability of at least one communication end for the data transmission refers to a capability of the current terminal (if the opposite communication end is another terminal, it refers to a capability of the current terminal and/or the opposite communication end).

In a possible embodiment of the present disclosure, Step 100 may at least include acquiring air-interface protocol layers to be used for the data transmission with the opposite communication end and functions of the respective air-interface protocol layers.

In actual use, a known air-interface protocol stack (e.g., an LTE air-interface protocol stack) or a new air-interface protocol stack may be adopted.

In the case that the LTE air-interface protocol stack is adopted, the air-interface protocol layers acquired in Step 100 may include at least one of a PDCP layer, an RLC layer and an MAC layer. A hierarchical relationship among the layers and functions thereof may be identical to those of the known LTE air-interface protocol stack.

In the case that the new air-interface protocol stack is adopted, the air-interface protocol layers and the functions of the respective air-interface protocol layers acquired in Step 100 may be different from those of the known air-interface protocol stack. For example, merely one air-interface protocol layer may be provided, and its function may be configured according to the practical need (i.e., in accordance with at least one data transmission characteristic for the data transmission). For another example, two or more air-interface protocol layers may be provided, and their functions may be configured according to the practical need. At this time, Step 100 may further include acquiring a hierarchical relationship among the air-interface protocol layers.

In the embodiments of the present disclosure, the hierarchical relationship among the air-interface protocol layers refers to an organization order of the data among the respective air-interface protocol layers. Taking the PDCP layer and the RLC layer as an example, the hierarchical relationship therebetween refers to that a PDU for the PDCP layer serves as an SDU for the RLC layer.

An implementation mode where the LTE air-interface protocol stack is adopted will be described in more details hereinafter.

In the case that the protocol layer for the data transmission is the MAC layer, a transmission requirement of the terminal corresponding to the data transmission characteristics may include parts or all of the followings: no header compression or air-interface encryption/decryption is required; a size of a data packet to be transmitted is smaller than a predetermined threshold; merely one data packet is transmitted each time with respect to one bearer, and data packet cascading is not required; and the terminal is capable of receiving the data from a plurality of bearers simultaneously. Correspondingly, at a transmitting end, Step 110 may include adding an MAC header to a high-layer data packet through the MAC layer, performing treatment (e.g., encoding) on an SDU added with the MAC header through a physical layer, and transmitting the treated SDU. At a receiving end, Step 110 may include restoring the high-layer data packet through the MAC layer in accordance with an MAC header indicator in the received data.

In the case that the protocol layer to be used for the data transmission includes the PDCP layer and the MAC layer, the transmission requirement of the terminal corresponding to the data transmission characteristics may include parts or all of the followings: header compression and air-interface encryption/decryption are required; a size of a data packet to be transmitted is smaller than a predetermined threshold; merely one data packet is transmitted each time with respect one bearer, and data packet cascading is not required; and the terminal is capable of receiving the data from a plurality of bearers simultaneously. Correspondingly, at the transmitting end, Step 110 may include performing header compression and encryption operations on a high-layer data packet through the PDCP layer, adding a PDCP header to acquire a PDCP PDU, performing treatment on the PDCP PDU through the MAC layer, adding an MAC header, performing treatment (e.g., encoding) on a SDU added with the MAC header through a physical layer, and transmitting the treated SDU. At the receiving end, Step 110 may include restoring the PDCP PDU through the MAC layer in accordance with an MAC header indicator in the received data, removing the PDCP header from the PDCP PDU through the PDCP layer, performing decryption and header decompression operations, and restoring the high-layer data packet.

In the case that the protocol layer to be used for the data transmission includes the PDCP layer and the RLC layer, the transmission requirement of the terminal corresponding to the data transmission characteristics may include one or two of the followings: header compression and air-interface encryption/decryption are required; and the terminal receives data merely from one bearer each time. Correspondingly, at the transmitting end, Step 110 may include performing header compression and encryption operations on a high-layer data packet through the PDCP layer, adding a PDCP header to acquire a PDCP PDU, performing treatment on the PDCP PDU through the RLC layer, adding an RLC header, performing treatment (e.g., encoding) a SDU added with the RLC header through a physical layer, and transmitting the treated SDU. At the receiving end, Step 110 may include restoring the PDCP PDU through the RLC layer in accordance with an RLC header indicator in the received data, removing the PDCP header from the PDCP PDU through the PDCP layer, performing decryption and header decompression operations, and restoring the high-layer data packet.

In the case that the protocol layer to be used for the data transmission includes the RLC layer and the MAC layer, the transmission requirement of the terminal corresponding to the data transmission characteristics may include one or two of the followings: no header compression or air-interface encryption/decryption is required; and the terminal receives data from a plurality of bearers simultaneously. Correspondingly, at the transmitting end, Step 110 may include performing treatment on a high-layer data packet through the RLC layer in accordance with a data volume capable of being supported by a transmission resource, adding an RLC header to an RLC PDU, performing treatment on the RLC PDU through the MAC layer, adding an MAC header, performing treatment (e.g., encoding) on an SDU added with the MAC header, and transmitting the treated SDU. At the receiving end, Step 110 may include restoring the RLC PDU through the MAC layer in accordance with an MAC header indicator in the received data, removing the RLC header from the RLC PDU through the RLC layer, and restoring the high-layer data packet from a data segment acquired after segmentation and cascading operations in accordance with an RLC header indicator.

For the implementation of configuring the new air-interface protocol stack, more details will be given in the following by taking merely one air-interface protocol layer as an example.

In Step 100, the acquired functions of the air-interface protocol layers to be used for the data transmission may include parts or all of the followings: a data packet cascading function, a header compression function, a header encryption function and a multiplexing function.

The implementation here may be performed in accordance with the functions, i.e., the air-interface PDU structure may be organized in accordance with the functions, and a data header may be added. For example, in the case that a specific opposite communication end merely supports one type of service transmission (a small data packet), the air-interface data organization and transmission may be configured to support the data packet cascading function, and during the organization of the PDU, it is merely necessary to cascade a plurality of data packets and add a protocol layer header.

Some implementation modes will be listed hereinafter.

Mode 1: the air-interface protocol stack is merely configured to support the data packet cascading function, i.e., the air-interface protocol layer merely supports the data packet cascading function.

Correspondingly, at the transmitting end, Step 110 may include performing a cascading operation on the high-layer data packets, organizing the cascaded high-layer data packets into a specific protocol layer, and adding a specific protocol layer packet head. At the receiving end, Step 110 may include restoring the high-layer data packets in accordance with the specific protocol layer packet header indicator in the received data. The specific protocol layer is a protocol layer capable of supporting the data packet cascading function, and the specific protocol layer packet header includes a domain for indicating information about a parameter of the high-layer data packet.

Figure 2:
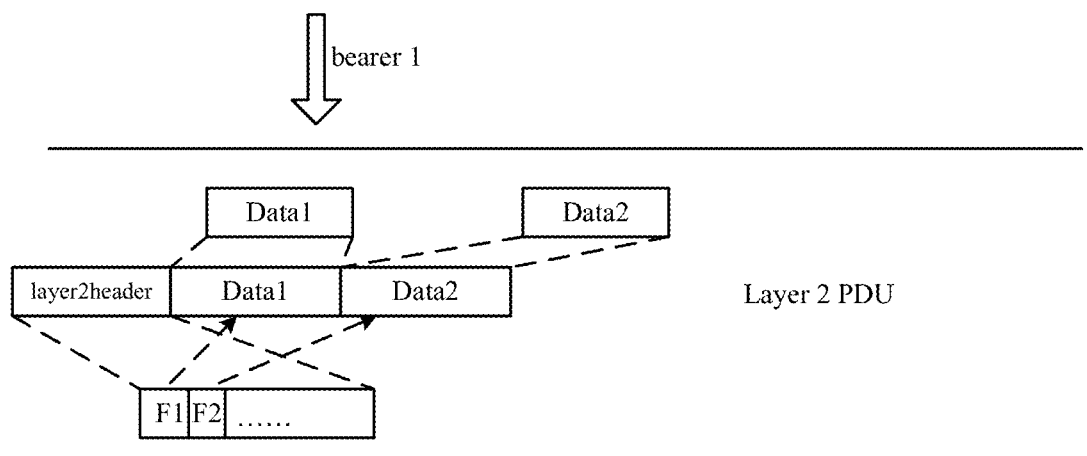
FIG. 2 is a schematic view showing an organization mode of air-interface high-layer data according to one embodiment of the present disclosure.

The organization of the high-layer data packets into the specific protocol layer may include forming the treated data into a data section for the specific protocol layer, and adding a specific protocol layer header identifier, so as to form the PDU for the specific protocol layer (the organization procedure occurring hereinafter has a similar meaning, merely with different layers into which the high-layer data packets are organized). FIG. 2 shows the mode 1. In the following, the specific protocol layer is called as layer 2, which may also be named in other ways according to the practical need.

The transmitting end may cascade the data, add a layer 2 header, so as to indicate a data domain. The layer 2 header may include domains for indicating different high-layer data packets, i.e., F1 and F2 in FIG. 2.

Downlink Data Transmission:

The base station may cascade the high-layer data packets, organize the cascaded high-layer data packets into a layer 2 PDU, and add a layer PDU header. The layer 2 PDU header may include a domain for indicating information about each high-layer data packet, e.g., a serial number and a length. This layer 2 PDU may probably be called as an MAC PDU, but its function and organization mode are different from those of an LTE MAC PDU. The terminal may receive the data from a physical layer, and restore the high-layer data packets in accordance with a layer 2 PDU header indicator.

Uplink Data Transmission:

The terminal may cascade the high-layer data packets, organize the cascaded high-layer data packets into the layer 2 PDU, and add the layer PDU header. The layer 2 PDU header may include a domain for indicating information about each high-layer data packet, e.g., a serial number and a length. This layer 2 PDU may probably be called as an MAC PDU, but its function and organization mode are different from those of the LTE MAC PDU. The base station may receive the data from a physical layer, and restore the high-layer data packets in accordance with a layer 2 PDU header indicator.

Mode 2: the air-interface protocol stack is configured to support the header compression, encryption and data packet cascading functions, i.e., the functions of the air-interface protocol layer includes the header compression, encryption and data packet cascading functions.

Correspondingly, at the transmitting end, Step 110 may include performing encryption and header compression operations on the high-layer data packets, performing a cascading operation on the treated high-layer data packets, organizing the cascaded high-layer data packets into a specific protocol layer, and adding a specific protocol layer packet header. At the receiving end, Step 110 may include performing a restoration operation on the data on which the encryption and header compression operations have been performed in accordance with a specific protocol layer packet indicator in the received data, performing decryption and header decompression operations on the data, and restoring the high-layer data packets. The specific protocol layer is a protocol layer capable of supporting the data packet cascading function, and the specific protocol layer packet header includes a domain for indicating information about a parameter of the high-layer data packet. FIG. 3 shows the mode 2. In the following, the specific protocol layer may be called as layer 2, which may also be named in any other ways according to the practical need.

The transmitting end may perform encryption and header compression operations on the data, organize the treated data into a data domain of a layer 2 PDUC, and add a layer 2 header to indicate the data domain. The layer 2 header may include domains for indicating different high-layer data packets, i.e., F1 and F2 in FIG. 3.

Downlink Data Transmission:

The base station may perform encryption and header compression operations on the high-layer data packets, organize the treated high-layer data packets into a layer 2 PDU, and add a layer 2 PDU header. The layer 2 PDU header may include a domain for indicating information about the data on which the encryption and header compression operations have been performed, e.g., a serial number and a length. This layer 2 PDU may probably be called as an MAC PDU, but its function and organization mode are different from those of the LTE MAC PDU. The terminal may receive the data from a physical layer, and restore the data on which the encryption and header compression operations have been performed in accordance with a layer 2 PDU header indicator, perform decryption and header decompression operations on the data, and restore the high-layer data packets.

Uplink Data Transmission:

The terminal may perform encryption and header compression operations on the high-layer data packets, organize the treated high-layer data packets into a layer 2 PDU, and add a layer 2 PDU header. The layer 2 PDU header may include a domain for indicating information about the data on which the encryption and header compression operations have been performed, e.g., a serial number and a length. This layer 2 PDU may probably be called as an MAC PDU, but its function and organization mode are different from those of the LTE MAC PDU. The base station may receive the data from a physical layer, and restore the data on which the encryption and header compression operations have been performed in accordance with a layer 2 PDU header indicator, perform decryption and header decompression operations on the data, and restore the high-layer data packets.

Mode 3: the air-interface protocol stack is configured to merely support the data packet cascading function and the bearer multiplexing function, i.e., the air-interface protocol layer is capable of supporting the data packet cascading function and the bearer multiplexing function.

Correspondingly, at the transmitting end, Step 110 may include performing data packet cascading and bearer multiplexing operations on the high-layer data packets, perform a cascading operation on the treated high-layer data packets, organizing the cascaded high-layer data packets into a specific protocol layer, and adding a specific protocol layer packet header. At the receiving end, Step 110 may include restoring the high-layer data packets in accordance with a specific protocol layer packet header indicator in the received data. The specific protocol layer is a protocol layer capable of supporting the data packet cascading function, and the specific protocol layer packet header includes a domain for indicating information about a parameter of the high-layer data packet. FIG. 4 shows the mode 3. In the following, the specific protocol layer may be called as layer 2, which may also be named in any other ways according to the practical need.

The transmitting end may cascade the data packets from an identical bearer, multiplex the data packets from different bearers, and add a layer 2 header to indicate a data domain. The layer 2 header may include domains for indicating different high-layer data packets, i.e., F1, F2 and F3 in FIG. 4.

Downlink Data Transmission:

The base station may perform cascading and bearer multiplexing operations on the high-layer data packets, organize the treated high-layer data packets into a layer 2 PDU, and add a layer 2 PDU header. The layer 2 PDU header may include a domain for indicating information about each high-layer data packet, e.g., a serial number and a length. This layer 2 PDU may probably be called as an MAC PDU, but its function and organization mode are different from those of the LTE MAC PDU. The terminal may receive the data from a physical layer, and restore the high-layer data packets in accordance with a layer 2 PDU header indicator.

Uplink Data Transmission:

The terminal may perform cascading and multiplexing operations on the high-layer data packets, organize the treated high-layer data packets into a layer 2 PDU, and add a layer 2 PDU header. The layer 2 PDU header may include a domain for indicating information about each high-layer data packet, e.g., a serial number and a length. This layer 2 PDU may probably be called as an MAC PDU, but its function and organization mode are different from those of the LTE MAC PDU. The base station may receive the data from a physical layer, and restore the high-layer data packets in accordance with a layer 2 PDU header indicator.

It should be appreciated that, the above description has been given by taking the configuration of one air-interface protocol layer as an example. In the case that two or more air-interface protocol layers are configured, the implementation mode thereof may refer to that mentioned above.

In a possible embodiment of the present disclosure, in Step 100, the air-interface protocol stack to be used for the data transmission may be acquired through configuration, or by receiving the configuration information or identification information about the air-interface protocol stack and then acquiring the air-interface protocol stack to be used for the data transmission with the opposite communication end in accordance with the configuration information or identification information.

In the case of acquiring the air-interface protocol stack through configuration, in a possible embodiment of the present disclosure, the air-interface protocol stack to be used for the data transmission with the opposite communication end may be configured in accordance with the data transmission characteristics reported by the opposite communication end.

In the case of receiving the air-interface protocol stack, for the implementation mode where the known air-interface protocol stack is adopted, different air-interface protocol stacks may be adopted. For example, one air-interface protocol stack may merely include the MAC layer, while the other air-interface protocol stack may merely include the PDCP layer and the RLC layer. At this time, different identification information may be assigned for different air-interface protocol stacks in advance, and the two ends for the data transmission may acquire the identification information in advance and understand it in an identical manner. An acquisition mode of the identification information is not limited herein, e.g., it may be configured before the device leaves the factory, or it may be notified to the terminal by a network side device, e.g., a base station, through broadcasting or dedicated signaling. In the case that a new air-interface protocol stack has been configured, the identification information about the air-interface protocol stack may be determined in a similar manner, and the two ends for the data transmission may acquire the identification information in advance and understand it in an identical manner.

In the case of receiving the air-interface protocol stack (e.g., receiving the air-interface protocol stack under the circumstance that the known air-interface protocol stack has been adopted, or the new air-interface protocol stacks have been adopted but the ends for the data transmission have acquired all the air-interface protocol stacks), the configuration information about the air-interface protocol stack may merely include the configuration information about the air-interface protocol layer to be used for the data transmission with the opposite communication end. Upon the receipt of the configuration information about the air-interface protocol layer, the air-interface protocol layer to be used may be acquired in accordance with the configuration information, and then the configuration of the acquired air-interface protocol stack may be looked up in accordance with the acquired air-interface protocol layer, so as to acquire the functions of the air-interface protocol layer. Similarly, the configuration information about the air-interface protocol stack may include: configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In a possible embodiment of the present disclosure, in the case of achieving the data transmission method in FIG. 1 by the network side device, a centralized control node of the self-organizing network or a cluster header of the D2D communication, Step 100 may include acquiring the air-interface protocol stack to be used for the data transmission with the opposite communication ends at a specific region, i.e., the terminals at the specific region may use an identical air-interface protocol stack. Also, Step 100 may include acquiring the air-interface protocol stack to be used for the data transmission with specific opposite communication ends, i.e., the specific terminals may use an identical air-interface protocol stack. In addition, Step 100 may include acquiring the air-interface protocol stack to be used for the data transmission with the opposite communication end in accordance with the data transmission characteristics reported by the opposite communication end, or obtaining the air-interface protocol stack from predetermined air-interface protocol stacks in accordance with a correspondence between the data transmission characteristics and the air-interface protocol stack configurations.

In the embodiments of the present disclosure, the specific opposite communication ends refer to a group of opposite communication ends having the identical data transmission characteristics, e.g., a group of opposite communication ends of an identical type or of an identical capability.

In a possible embodiment of the present disclosure, prior to Step 110, the data transmission method further includes transmitting the acquired configuration information or identification information about the air-interface protocol stack to the opposite communication end.

As shown in FIG. 5, the present disclosure provides in some embodiments an air-interface protocol stack configuration method, which at least includes the following steps.

Step 500: configuring an air-interface protocol stack to be used for data transmission in accordance with data transmission characteristics of communication ends for the data transmission. The communication ends for the data transmission may be a base station and a terminal in a cellular network, an access point and a terminal in a WLAN network, at least two terminals in a self-organizing network or D2D communication, or at least two base stations in the cellular network, at least two access points in the WLAN network, the base stations in the cellular network or the access points in the WLAN network.

Step 510: transmitting configuration information or identification information about the air-interface protocol stack to at least one of the communication ends for the data transmission. Definitions of the configuration information and the identification information about the air-interface protocol stack may refer to those in the above-mentioned data transmission method, and thus will not be particularly defined herein.

In a possible embodiment of the present disclosure, the configuration information or identification information about the air-interface protocol stack may be transmitted to parts of the communication ends for the data transmission and then the communication ends that have received the configuration information or identification information may notify the information to the other communication ends. Also, the configuration information or identification information may be transmitted to all of the communication ends.

The method in FIG. 5 may be implemented by the base stations in the cellular network that are to take part in the data transmission, or by super base stations in the cellular network that are capable of controlling and managing the other base stations/access points. In addition, it may also be implemented by the access points in the WLAN network that are to take part in the data transmission, or by decision nodes in the self-organizing network (these decision nodes may be terminals that are to take part in the data transmission and configured by a final decision air-interface protocol stack, or centralized control nodes), or by D2D terminals configured by the final decision air-interface protocol stack in the D2D communication.

In a possible embodiment of the present disclosure, Step 500 may at least include configuring air-interface protocol layers to be used for the data transmission and/or functions of the respective air-interface protocol layers in accordance with data transmission characteristics for the data transmission by the communication ends.

As mentioned above, in actual use, the known air-interface protocol stack (e.g., the LTE air-interface protocol stack) or a new air-interface protocol stack may be adopted.

In the case that the LTE air-interface protocol stack is adopted, at least one of a PDCP layer, an RLC layer and an MAC layer may be selected to configure the air-interface protocol sack for the data transmission. For example, in the case that a service type of the data transmission is a single service and a data volume type is a small data volume, data packets may merely be cascaded. Correspondingly, the protocol stack for the data transmission may merely include the RLC layer and the functions thereof may be adopted.

In the case that the new air-interface protocol stack is adopted, at least one air-interface protocol layer and the functions thereof may be configured in accordance with the data transmission characteristics for the data transmission. For example, in the case that a service type of the data transmission is a single service and a data volume type is a small data volume, data packets may merely be cascaded. Correspondingly, one air-interface protocol layer may be configured, and the function of the air-interface protocol layer may merely include a cascading function.

In the case that the new air-interface protocol stack and at least two air-interface protocol layers have been configured, Step 500 may further include configuring a hierarchical relationship between the air-interface protocol layers.

In a possible embodiment of the present disclosure, Step 500 may include: configuring, for the communication ends at a specific region, the air-interface protocol stack to be used for the data transmission in accordance with the data transmission characteristics of the communication ends for the data transmission; or configuring, for specific communication ends, the air-interface protocol stack to be used for the data transmission in accordance with the data transmission characteristics of the communication ends for the data transmission; or configuring the air-interface protocol stack to be used for the data transmission in accordance with the data transmission characteristics reported by at least one of the communication ends for the data transmission; or selecting an air-interface protocol stack from a plurality of predetermined air-interface protocol stacks in accordance with a correspondence between the data transmission characteristics and air-interface protocol stack configurations, as the air-interface protocol stack to be used for the data transmission.

In a possible embodiment of the present disclosure, in the case that the method in FIG. 5 is to be implemented by one communication end that takes part in the data transmission, the specific communication end may be just a specific opposite communication end.

The method will be described hereinafter in conjunction with application scenarios.

It should be appreciated that, in the following embodiments of the present disclosure, the description will be given by taking the known LTE air-interface protocol stack as an example, and each application scenario will be described by taking one specific air-interface protocol stack configuration as an example. However, the following embodiments may be implemented in combination with the above-mentioned embodiments where the known LTE air-interface protocol stack is adopted and the above-mentioned embodiments where the new air-interface protocol stack is adopted.

Figure 6:
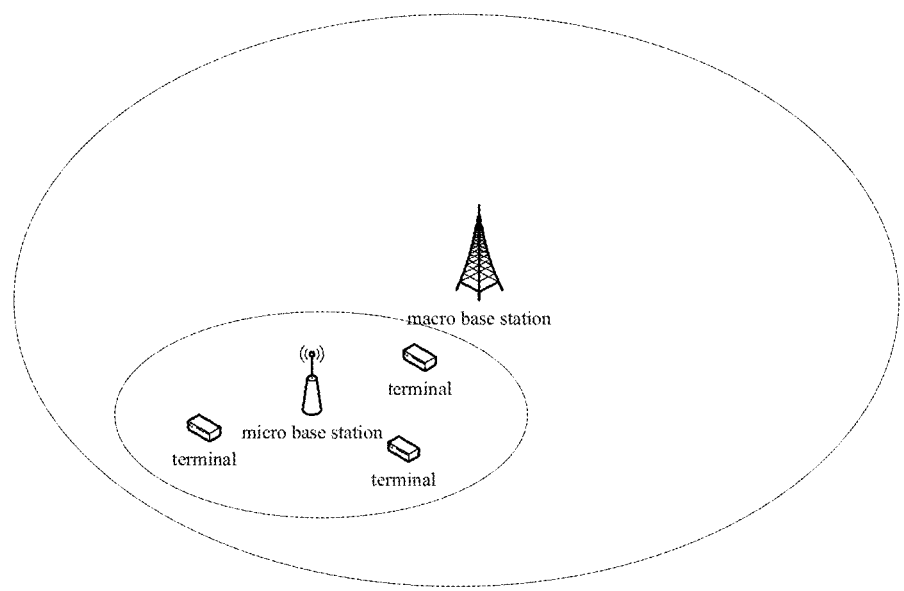
FIG. 6 is a schematic view showing first network architecture according to one embodiment of the present disclosure.

Application scenario 1: for network architecture in FIG. 6, a larger solid box represents a coverage range of a macro base station, and a smaller solid box represents a coverage range of a micro base station. The coverage range of the micro base station is a certain factory for the communication with respect to industrial automation control. Terminals at a specific region (i.e., MTC terminals in the factory) may use an identical air-interface protocol stack configuration, and the micro base station may notify the MTC terminals of the air-interface protocol stack configuration. The terminals accessing to the macro base station may adopt the known LTE air-interface protocol stack, or an air-interface protocol stack configuration different from the micro base station.

The implementation of the method in the embodiments of the present disclosure in the application scenario 1 will be described as follows.

In accordance with the data transmission characteristics including the application scenario where the data transmission is performed between the micro base station and the MTC terminal (i.e., the industrial automation control scenario) and the data volume type of the data transmission (i.e., a small data volume), the air-interface protocol stack to be used for the data transmission with the MTC terminal at a specific region may be pre-configured at the micro base station, and the identification information (e.g., an index 1) may be assigned for the air-interface protocol stack. For example, the air-interface protocol stack 1 may merely include the RLC layer of the known LTE air-interface protocol stack.

In this embodiment, the specific region refers to a specific cell or a dedicated region (e.g., a TA region) belonging to one or more micro base stations.

The micro base station may broadcast the configuration information about the air-interface protocol stack through a cell system message or region message at the specific region (e.g., a Multimedia Broadcast Multicast Service (MBMS) message at a Multicast Broadcast Single Frequency Network (MBSFN) region), and the configuration information may be carried in the message. In the case that the air-interface protocol stack 1 has been configured in the MTC terminal, the identification information about the air-interface protocol stack, rather than the configuration information, may be carried in the message.

Upon the receipt of the configuration information about the air-interface protocol stack, the MTC terminal may acquire the air-interface protocol stack 1 in accordance with the carried configuration information and/or identification information.

For the subsequent uplink/downlink data transmission, the micro base station and the MTC terminal may organize air-interface data units in accordance with the configuration of the air-interface protocol stack 1, and transmit the air-interface data units.

To be specific, the transmitting end may perform a cascading operation on the data packets, add the RLC layer header to form the RLC PDU, and transmit the RLC PDU to the physical layer. After the corresponding treatment through the physical layer, the RLC PDU may be transmitted via an air-interface. The receiving end may parse the data packets in a contrary procedure.

For the MTC communication in such scenarios as industrial automation control, telemedicine and smart grid, the service type of the data transmission is single, the data volume is very small, and time delay reliability and power consumption are highly demanded. In the case of adopting the known LTE air-interface protocol, the processing complexity and duration may increase. In this embodiment of the present disclosure, the air-interface protocol stack 1 merely includes the RLC layer, so it is able to reduce the processing complexity and improve the processing efficiency, thereby to reduce the time delay and the power consumption.

Figure 7:
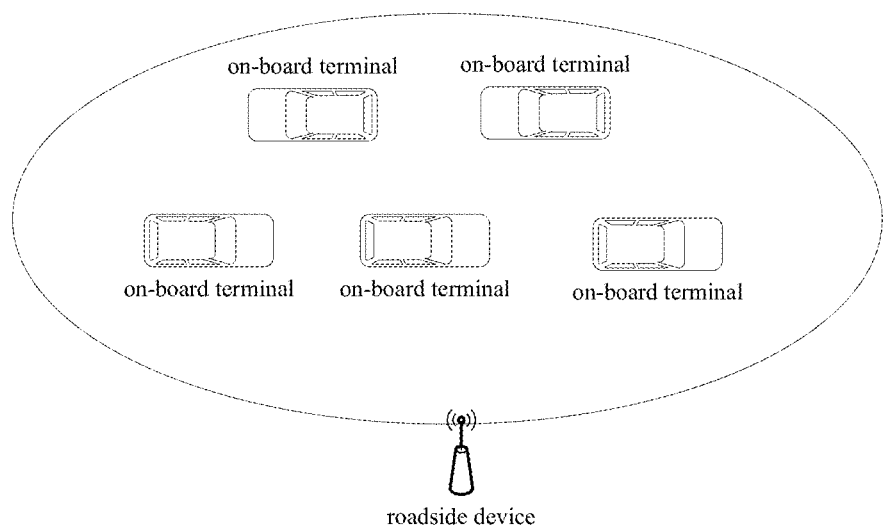
FIG. 7 is a schematic view showing second network architecture according to one embodiment of the present disclosure.

Application scenario 2: for Internet of Vehicle architecture in FIG. 7, terminals at a specific region (i.e., on-board terminals) may adopt an identical air-interface protocol stack configuration, and a base station (i.e., a roadside device) may notify the on-board terminals the air-interface protocol stack configuration.

The implementation of the method in the embodiments of the present disclosure in the application scenario 2 will be described as follows.

In accordance with the data transmission characteristics including the application scenario where the data transmission is performed between the roadside device and the on-board terminals (i.e., an Internet of Vehicle scenario) and the data volume type of the data transmission (i.e., a small data volume), the air-interface protocol stack for the data transmission with the on-board terminals at the specific region may be pre-configured in the roadside device, and identification information (e.g., an index 1) may be assigned for the air-interface protocol stack. For example, the air-interface protocol stack 1 may merely include the RLC layer of the known LTE air-interface protocol stack.

In this embodiment, the specific region refers to a specific cell or a dedicated region (e.g., a TA region) belonging to one or more roadside devices.

In the case that the on-board terminal accesses to a cell corresponding to the specific region, the roadside device may carry the above-mentioned configuration information in access signaling (e.g., an access response message or a connection completion message). In the case that the air-interface protocol stack 1 is also pre-configured in the on-board terminal, the identification information about the air-interface protocol stack, rather than the configuration information, may be carried in the signaling.

Upon the receipt of the access signaling, the on-board terminal may acquire the air-interface protocol stack 1 in accordance with the carried configuration information and/or identification information.

For the subsequent uplink/downlink data transmission, the roadside device and the on-board terminal may organize an air-interface data unit in accordance with the configuration of the air-interface protocol stack 1, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Most of the data packets transmitted in the Internet of Vehicle are small data packets, each having a size of 1 to 100 bytes. In the case that the known LTE air-interface protocol stack is adopted, excessive overhead may occur for the header added by each protocol layer, as compared with valid information. However, in this embodiment of the present disclosure, the air-interface protocol stack 1 merely includes the RLC layer, so it is able to remarkably reduce the air-interface overhead and reduce the time delay for the processing.

Application scenario 3: for the network architecture as shown in FIG. 6, the coverage range of the micro base station is a certain factory for the communication with respect to industrial automation control. Terminals at a specific region (i.e., MTC terminals in the factory) may use an identical air-interface protocol stack configuration, and the air-interface protocol stack configuration may be notified to the MTC terminals via core network signaling. The terminals accessing to the macro base station may adopt the known LTE air-interface protocol stack, or an air-interface protocol stack configuration different from the micro base station.

In accordance with the data transmission characteristics including the application scenario where the data transmission is performed between the micro base station and the MTC terminal (i.e., the industrial automation control scenario) and the data volume type of the data transmission (i.e., a small data volume), the air-interface protocol stack to be used for the data transmission with the MTC terminal at a specific region may be pre-configured at a core network device (e.g., a Mobile Management Entity (MME) or a Packet Data Network Gateway (PGW)), the micro base station or the micro base station, and the identification information (e.g., an index 1) may be assigned for the air-interface protocol stack. For example, the air-interface protocol stack 1 may merely include the RLC layer of the known LTE air-interface protocol stack.

In the case that the air-interface protocol stack at the specific region is configured by the core network device, the core network device may notify the configuration of the air-interface protocol stack to a base station to which the specific region belongs (i.e., the micro base station in FIG. 6), and during the attachment of the MTC terminal at the specific region to a network or the initiation of a service request, notify the MTC terminal of the air-interface protocol stack to be adopted at the specific region. Correspondingly, the MTC terminal may acquire the air-interface protocol stack by updating core network information.

In the case that the air-interface protocol stack at the specific region is configured by the macro base station, the macro base station may notify the configuration of the air-interface protocol stack to the core network device and the micro base station. During the attachment of the MTC terminal at the specific region to the network or the initiation of the service request, the core network device may notify the MTC terminal of the air-interface protocol stack to be adopted at the specific region. Correspondingly, the MTC terminal may acquire the air-interface protocol stack by updating the core network information.

In the case that the air-interface protocol stack at the specific region is configured by the micro base station, the micro base station may further notify the configuration of the air-interface protocol stack to the core network device. During the attachment of the MTC terminal at the specific region to the network or the initiation of the service request, the core network device may notify the MTC terminal of the air-interface protocol stack to be adopted at the specific region. Correspondingly, the MTC terminal may acquire the air-interface protocol stack by updating the core network information.

In this embodiment, the specific region refers to a specific cell or a dedicated region (e.g., a TA region) belonging to one or more micro base stations.

For the subsequent uplink/downlink data transmission, the micro base station and the MTC terminal may organize air-interface data units in accordance with the configuration of the air-interface protocol stack 1, and transmit the air-interface data units.

To be specific, the transmitting end may perform a cascading operation on the data packets, add the RLC layer header to form the RLC PDU, and transmit the RLC PDU to the physical layer. After the corresponding treatment through the physical layer, the RLC PDU may be transmitted via an air-interface. The receiving end may parse the data packets in a contrary procedure.

Figure 8:
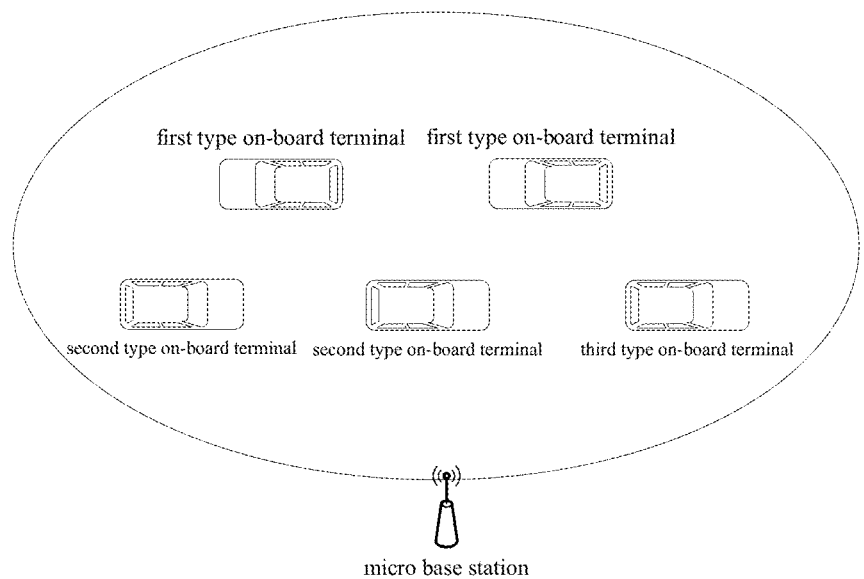
FIG. 8 is a schematic view showing third network architecture according to one embodiment of the present disclosure.

Application scenario 4: for the Internet of Vehicle architecture in FIG. 8, specific terminals (i.e., specific on-board terminals) may adopt an identical air-interface protocol stack configuration, and a base station (i.e., the roadside device) may notify the on-board terminals of the air-interface protocol stack configuration.

In actual use, the specific terminals may be determined according to the practical need. In this application scenario, there are two types of on-board terminals, and the on-board terminals of each type are just specific terminals of an identical type.

The implementation of the method in the embodiments of the present disclosure in the application scenario 4 will be described as follows.

In accordance with the data transmission characteristics including the application scenario where the data transmission is performed between the roadside device and the on-board terminals (i.e., the Internet of Vehicle scenario), the data volume type of the data transmission (i.e., a small data volume), a type of the on-board terminal and a capability of the on-board terminal (e.g., a data processing capability at the physical layer), the air-interface protocol stack 1 to be used for the data transmission with the on-board terminals of a first type and an air-interface protocol stack 2 to be used for the data transmission with the on-board terminals of a second type may be pre-configured in the roadside device. In addition, identification information may be configured for the air-interface protocol stacks (e.g., an index 1 may be configured for the air-interface protocol stack corresponding to the on-board terminals of the first type, and an index 2 may be configured for the air-interface protocol stack corresponding to the on-board terminals of the second type). For example, the air-interface protocol stack 1 merely includes the RLC layer of the known LTE air-interface protocol stack, and the air-interface protocol stack 2 merely includes the RLC layer and the MAC layer of the known LTE air-interface protocol stack.

The roadside device may broadcast an air-interface protocol stack configuration message and a correspondence between the air-interface protocol stacks and the types of the on-board terminals in a cell system message or region message. Configuration information about the air-interface protocol stack 1 and the air-interface protocol stack 2 may be carried in the air-interface protocol stack configuration message.

In this embodiment of the present disclosure, the specific terminals refer to the terminal of an identical type, so the correspondence between the air-interface protocol stacks and the types of the on-board terminals may be broadcast. It should be appreciated that, the correspondence between the data transmission characteristics of the specific terminals and the air-interface protocol stacks is actually broadcast. For example, in the case that the specific terminals refer to the terminals of an identical service type, the correspondence between the service types and the air-interface protocol stacks may be broadcast.

Upon the receipt of the air-interface protocol stack configuration message and the correspondence, the on-board terminal may acquire the air-interface protocol stack to be used by it in accordance with the carried configuration information and/or identification information as well as the correspondence. The on-board terminal of the first type may acquire the air-interface protocol stack 1, and the on-board terminal of the second type may acquire the air-interface protocol stack 2.

For the subsequent uplink/downlink data transmission, the roadside device and the on-board terminal may organize an air-interface data unit in accordance with the configuration of the air-interface protocol stack 1, and transmit the air-interface data unit.

To be specific, for the data transmission with the on-board terminal of the first type, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure. For the data transmission with the on-board terminal of the second type, the transmitting end may perform a cascading operation on the data packets, add an RLC layer header to form an RLC PDU, and transmit the RLC PDU to the MAC layer. The RLC PDUs from a plurality of bearers (which may bear MAC SDUs at the MAC layer) may be cascaded at the MAC layer into an MAC PDU, and an MAC header may be added, and then the resultant MAC PDU may be transmitted to the physical layer. After the corresponding treatment through the physical layer, the MAC PDU may be transmitted via an air-interface. The receiving end may parse the data packets in a contrary procedure.

Figure 9:
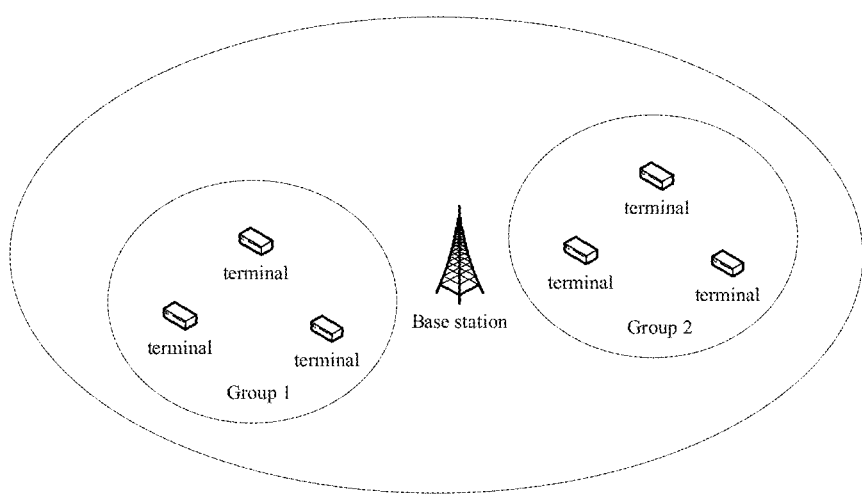
FIG. 9 is a schematic view showing fourth network architecture according to one embodiment of the present disclosure.

Application Scenario 5: for network architecture in FIG. 9, terminals (specific terminals) in group 1 may adopt an identical air-interface protocol stack configuration, terminals (specific terminals) in group 2 may adopt an identical air-interface protocol stack configuration, and a base station may notify the air-interface protocol stack configurations to the terminals.

In actual use, the specific terminals may be determined according to the practical need. In this application scenario, the terminals are divided into two groups in accordance with their types, and the terminals in each group are just the specific terminals.

The implementation of the method in the embodiments of the present disclosure in the application scenario 5 will be described as follows.

In accordance with the data transmission characteristics including a data volume type of the data transmission (i.e., a small data volume), a type of the terminal and a capability of the terminal (e.g., a data processing capability at the physical layer), the air-interface protocol stack 1 for the data transmission with the terminals in group 1 and the air-interface protocol stack 2 for the data transmission with the terminals in group 2 may be pre-configured at the base station. In addition, identification information may be assigned for the air-interface protocol stacks (e.g., an index 1 may be assigned for the air-interface protocol stack corresponding to the terminals in group 1, and an index 2 may be assigned for the air-interface protocol stack corresponding to the terminals in group 2). For example, the air-interface protocol stack 1 may merely include the RLC layer of the known LTE air-interface protocol stack, and the air-interface protocol stack 2 may merely include the RLC layer and the MAC layer of the known LTE air-interface protocol stack.

The base station may transmit air-interface protocol stack configuration messages and multicasting identifiers to the terminals in the two groups via a multicasting message.

Upon the receipt of the air-interface protocol stack configuration message and the multicasting identifier, the terminal may acquire the air-interface protocol stack to be used by it in accordance with the carried configuration information and/or identification information as well as the multicasting identifier. The terminal in group 1 may acquire the air-interface protocol stack 1, and the terminal in group 2 may acquire the air-interface protocol stack 2.

For the subsequent uplink/downlink data transmission, the base station and the terminal may organize an air-interface data unit in accordance with the configuration of the air-interface protocol stack, and transmit the air-interface data unit.

To be specific, for the data transmission with the terminal in group 1, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure. For the data transmission with the terminal in group 2, the transmitting end may perform a cascading operation on the data packets, add the RLC layer header to form the RLC PDU, and transit the RLC PDU to the MAC layer. The RLC PDUs from a plurality of bearers (which may bear an MAC SDU at the MAC layer) may be cascaded at the MAC layer into one MAC PDU, and an MAC layer header may be added, and then the resultant MAC PDU may be transmitted to the physical layer. After the corresponding treatment through the physical layer, the RLC PDU may be transmitted via an air-interface. The receiving end may parse the data packets in a contrary procedure.

Application scenario 6: for the Internet of Vehicle architecture in FIG. 8, specific terminals (i.e., specific on-board terminals) may adopt an identical air-interface protocol stack configuration, and the base station (i.e., the roadside device) may notify the air-interface protocol stack configuration to the on-board terminal via dedicated signaling.

In actual use, the specific terminals may be determined according to the practical need. In this application scenario, there two types of on-board terminals, and the on-board terminals of each type are just specific terminals of an identical type.

The implementation of the method in the embodiments of the present disclosure in the application scenario 6 will be described as follows.

In accordance with the data transmission characteristics including the application scenario where the data transmission is performed between the roadside device and the on-board terminals (i.e., the Internet of Vehicle scenario), a data volume type of the data transmission (i.e., a small data volume), a type of the on-board terminal and a capability of the on-board terminal (e.g., a data processing capability at the physical layer), the air-interface protocol stack 1 for the data transmission with the on-board terminals of a first type and the air-interface protocol stack 2 for the data transmission with the on-board terminals of a second type may be pre-configured in the roadside device. In addition, identification information may be assigned for the air-interface protocol stacks (e.g., an index 1 may be assigned for the air-interface protocol stack corresponding to the on-board terminals of the first type, and an index 2 may be assigned for the air-interface protocol stack corresponding to the on-board terminals of the second type). For example, the air-interface protocol stack 1 may merely include the RLC layer of the known LTE air-interface protocol stack, and the air-interface protocol stack 2 may merely include the RLC layer and the MAC layer of the known LTE air-interface protocol stack.

The on-board terminal may transmit a connection request and an indicator indicating the data transmission characteristics (e.g., the type of the on-board terminal in this embodiment) to the roadside device.

Upon the receipt of the connection request and the indicator indicating the data transmission characteristics, the roadside device may determine the air-interface protocol stack corresponding to the on-board terminal in accordance with the indicator, and carry the configuration information and/or identification information about the determined air-interface protocol stack in access signaling.

The on-board terminal may acquire the air-interface protocol stack in accordance with the received configuration information and/or identification information. The on-board terminal of the first type may acquire the air-interface protocol stack 1, and the on-board terminal of the second type may acquire the air-interface protocol stack 2.

For the subsequent uplink/downlink data transmission, the roadside device and the on-board terminal may organize an air-interface data unit in accordance with the configuration of the air-interface protocol stack 1, and transmit the air-interface data unit.

To be specific, for the data transmission with the on-board terminal of the first type, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure. For the data transmission with the on-board terminal of the second type, the transmitting end may perform a cascading operation on the data packets, add the RLC layer header to form the RLC PDU, and transmit the RLC PDU to the MAC layer. The RLC PDUs from a plurality of bearers (which may bear an MAC SDU at the MAC layer) may be cascaded at the MAC layer into one MAC PDU, and an MAC layer header may be added, and then the resultant MAC PDU may be transmitted to the physical layer. After the corresponding treatment through the physical layer, the RLC PDU may be transmitted via an air-interface. The receiving end may parse the data packets in a contrary procedure.

Application scenario 7: for the network architecture in FIG. 9, the terminals (specific terminals) in group 1 may adopt an identical air-interface protocol stack configuration, the terminals (specific terminals) in group 2 may adopt an identical air-interface protocol stack configuration, and the air-interface protocol stack configurations may be notified to the terminals via core network signaling.

In accordance with the data transmission characteristics including a data volume type of the data transmission (i.e., a small data volume), a type of the terminal and a capability of the terminal (e.g., a data processing capability at the physical layer), the air-interface protocol stack 1 for the data transmission with the terminal in group 1 and the air-interface protocol stack 2 for the data transmission with the terminal in group 2 may be pre-configured at the base station. In addition, identification information may be assigned for the air-interface protocol stacks (e.g., an index 1 may be assigned for the air-interface protocol stack corresponding to the terminal in group 1, and an index 2 may be assigned for the air-interface protocol stack corresponding to the terminal in group 2). For example, the air-interface protocol stack 1 may merely include the RLC layer of the known LTE air-interface protocol stack, and the air-interface protocol stack 2 may merely include the RLC layer and the MAC layer of the known LTE air-interface protocol stack.

In the case that the air-interface protocol stack is configured by the core network device, the core network device may, during the attachment of the terminal to the network or the initiation of a service request, identify the data transmission characteristics of the terminal, determine the air-interface protocol stack in accordance with the data transmission characteristics, and notify the configuration of the determined air-interface protocol stack to the base station to which the terminal belongs and the terminal. Correspondingly, the terminal may acquire the air-interface protocol stack by updating core network information. In a possible embodiment of the present disclosure, during the request, the terminal may further transmit an indicator indicating the data transmission characteristics.

In the case that the air-interface protocol stack is configured by the base station, the base station may notify the configuration of the air-interface protocol stack to the core network device. During the attachment of the terminal to the network or the initiation of the service request, the core network device may identify the data transmission characteristics of the terminal, determine the air-interface protocol stack for the terminal in accordance with the data transmission characteristics, and notify the air-interface protocol stack to the terminal and the base station to which the terminal belongs. Correspondingly, the terminal may acquire the air-interface protocol stack by updating the core network information.

For the subsequent uplink/downlink data transmission, the base station and the terminals in group 1 may organize an air-interface data unit in accordance with the configuration of the air-interface protocol stack 1, and transmit the air-interface data unit. The base station and the terminals in groups 2 may organize an air-interface data unit in accordance with the configuration of the air-interface protocol stack 2, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Application scenario 8: for the network architecture in FIG. 6, the larger solid box represents the coverage range of the macro base station, and the smaller solid box represents the coverage range of the micro base station. The air-interface protocol stack may be configured by the micro base station for the terminal in accordance with the data transmission characteristics reported by the terminal. The terminal accessing to the macro base station may adopt the known LTE air-interface protocol stack, or an air-interface protocol stack configuration different from the micro base station.

The implementation of the method in the embodiments of the present in the application scenario 8 will be described as follows.

In the case that the terminal accesses to a cell, it may transmit to the micro base station indication information about the data transmission characteristics, a service request and a request for a protocol stack configuration mode. The micro base station may configure the air-interface protocol stack 1 for the terminal in accordance with the data transmission characteristics reported by the terminal, and transmit the configuration information and/or identification information about the air-interface protocol stack 1 via the access signaling. The terminal may then acquire the air-interface protocol stack 1 in accordance with information carried in the access signaling.

For the subsequent uplink/downlink data transmission, the micro base station and the terminal may organize an air-interface data unit in accordance with the configuration of the air-interface protocol stack 1, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Application scenario 9: for the network architecture in FIG. 6, the larger solid box represents the coverage range of the macro base station, and the smaller solid box represents the coverage range of the micro base station. The micro base station and the terminal within the coverage range of the micro base station may adopt an agreed air-interface protocol stack configuration. The terminal accessing to the macro base station may adopt the known LTE air-interface protocol stack, or an air-interface protocol stack configuration different from the micro base station.

The implementation of the method in the embodiments of the present disclosure in the application scenario 9 will be described as follows.

Through pre-agreement (e.g., through speculation in a protocol), pre-configured air-interface protocol stacks and a correspondence between the air-interface protocol stacks and the data transmission characteristics (e.g., the type of the terminal and/or the capability of the terminal) may be stored in the micro base station and the terminal.

In the case that the terminal accesses to a cell, it may transmit to the micro base station indication information about the data transmission characteristics, and acquire the corresponding air-interface protocol stack 1 in accordance with the data transmission characteristics. The micro base station may acquire the corresponding air-interface protocol stack 1 in accordance with the data transmission characteristics reported by the terminal.

For the subsequent uplink/downlink data transmission, the micro base station and the terminal may organize an air-interface data unit in accordance with the configuration of the air-interface protocol stack 1, and transmit the air-interface data unit.

To be specific, the transmitting end may performing a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Figure 10:
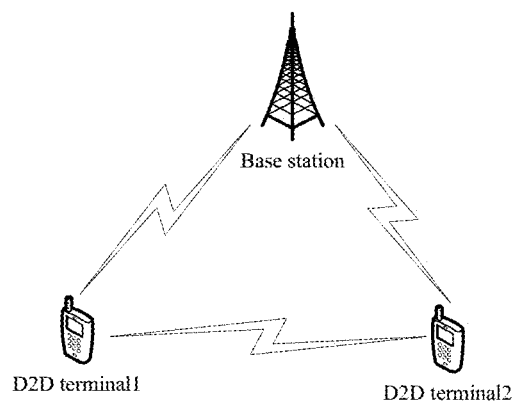
FIG. 10 is a schematic view showing fifth network architecture according to one embodiment of the present disclosure.

Application scenario 10: for network-aided D2D communication network architecture in FIG. 10, D2D communication may be performed between a D2D terminal 1 and a D2D terminal 2, and a base station may configure an air-interface protocol stack for the data transmission of the D2D communication.

The implementation of the method in the embodiments of the present disclosure in the application scenario 10 will be described as follows.

The D2D terminal 1 and/or the D2D terminal 2 may report to the base station the data transmission characteristics for the data transmission of the D2D communication (e.g., a type of the D2D terminal and a capability of the D2D terminal).

The base station may configure for the D2D terminal 1 and/or the D2D terminal 2 the air-interface protocol stack for the data transmission, e.g., the air-interface protocol stack 1, in accordance with the reported data transmission characteristics, and a specific configuration procedure may refer to that mentioned above.

The base station may transmit the configuration information and/or identification information about the air-interface protocol stack 1 to the D2D terminal 1 and/or the D2D terminal 2. In the case that the configuration information and/or identification information is merely transmitted to one of the D2D terminals, the D2D terminal may notify it to the other D2D terminal.

The D2D terminal 1 and the D2D terminal 2 may acquire the air-interface protocol stack 1 in accordance with the received configuration information and/or identification information.

For the subsequent D2D data transmission, the D2D terminal 1 and the D2D terminal 2 may organize an air-interface data unit in accordance with the configuration of the air-interface protocol stack 1, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Figure 11:
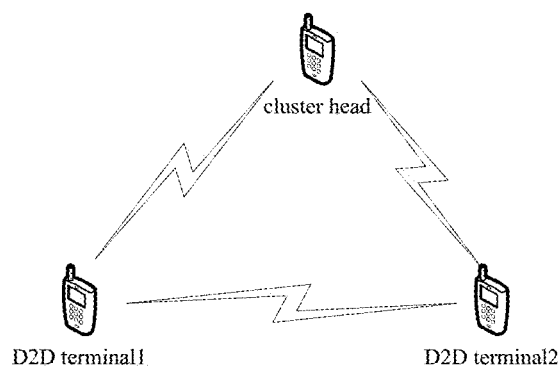
FIG. 11 is a schematic view showing sixth network architecture according to one embodiment of the present disclosure.

Application scenario 11: for self-organizing D2D communication network architecture in FIG. 11, the D2D communication may be performed between a D2D terminal 1 and a D2D terminal 2, and an air-interface protocol stack may be configured by a cluster head for the data transmission of the D2D communication.

The implementation of the method in the embodiments of the present disclosure in the application scenario 11 will be described as follows.

The D2D terminal 1 and/or the D2D terminal 2 may report to the cluster head the data transmission characteristics of the data transmission of the D2D communication (e.g., a type of the D2D terminal and a capability of the D2D terminal). The cluster head may configure for the D2D terminal 1 and/or the D2D terminal 2 the air-interface protocol stack in accordance with the reported data transmission characteristics, e.g., configure for the D2D terminal 1 and/or the D2D terminal 2 the air-interface protocol stack 1 (a specific configuration procedure may refer to that mentioned above). The cluster head may transmit the configuration information and/or identification information about the air-interface protocol stack 1 to the D2D terminal 1 and/or the D2D terminal 2. In the case that the configuration information and/or identification information is merely transmitted to one of the D2D terminals, the D2D terminal may notify the other D2D terminal of the configuration information and/or identification information about the air-interface protocol stack 1. The D2D terminal 1 and the D2D terminal 2 may then acquire the air-interface protocol stack 1 in accordance with the received configuration information and/or identification information.

For the subsequent D2D data transmission, the D2D terminal 1 and the D2D terminal 2 may each organize an air-interface data unit in accordance with the air-interface protocol stack 1, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Figure 12:
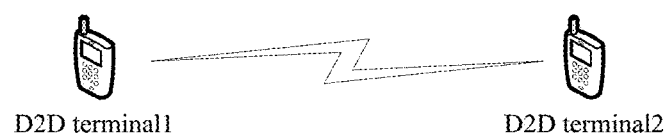
FIG. 12 is a schematic view showing seventh network architecture according to one embodiment of the present disclosure.

Application scenario 12: for network-aided D2D communication network architecture in FIG. 12, D2D communication may be performed between a D2D terminal 1 and a D2D terminal 2, and an air-interface protocol stack may be configured through negotiation.

The implementation of the method in the embodiments of the present disclosure in the application scenario 12 will be described as follows.

The D2D terminal 1 may transmit the data transmission characteristics (e.g., a type of the D2D terminal 1 and a capability of the D2D terminal 1) to the D2D terminal 2. The D2D terminal 2 may configure the air-interface protocol stack for the data transmission in accordance with the data transmission characteristics reported by the D2D terminal 1, and in a possible embodiment of the present disclosure, in combination with a type and/or a capability of the D2D terminal 2. For example, the D2D terminal 2 may configure the air-interface protocol stack 1 for the data transmission (a specific configuration procedure may refer to that mentioned above). The D2D terminal 2 may then transmit the configuration information and/or identification information about the air-interface protocol stack 1 to the D2D terminal 1. Then, the D2D terminal 1 may acquire the air-interface protocol stack 1 in accordance with the received configuration information and/or identification information.

For the subsequent D2D data transmission, the D2D terminal 1 and the D2D terminal 2 may each organize an air-interface data unit in accordance with the air-interface protocol stack 1, and transmit the air-interface data unit.

To be specific, the transmitting end may perform a cascading operation on the data packets, add an RLC layer header to form an RLC PDU, and transmit the RLC PDU to the physical layer. After the corresponding treatment through the physical layer, the RLC PDU may be transmitted via an air-interface. The receiving end may parse the data packets in a contrary procedure.

Figure 13:
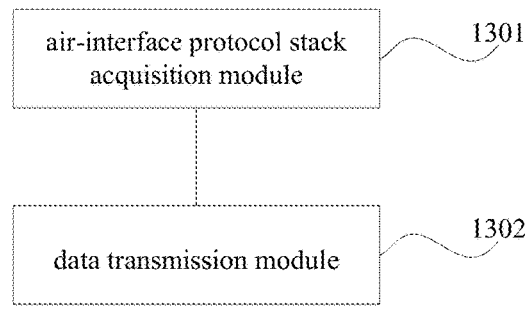
FIG. 13 is a schematic view showing a data transmission device according to one embodiment of the present disclosure.

Based on an identical inventive concept, the present disclosure provides in some embodiments a data transmission device which, as shown in FIG. 13, includes: an air-interface protocol stack acquisition module 1301 configured to acquire an air-interface protocol stack to be used for data transmission with an opposite communication end, the air-interface protocol stack being configured in accordance with data transmission characteristics for the data transmission with the opposite communication end; and a data transmission module 1302 configured to perform the data transmission with the opposite communication end in accordance with the air-interface protocol stack.

In a possible embodiment of the present disclosure, the data transmission characteristics for the data transmission with the opposite communication end includes parts or all of the followings: a service type of the data transmission with the opposite communication end, a data volume type of the data transmission with the opposite communication end, a type of the opposite communication end, a type of the data transmission device, a capability of the opposite communication end, a capability of the data transmission device, and an application scenario of the data transmission with the opposite communication end.

In a possible embodiment of the present disclosure, the air-interface protocol stack acquisition module is further configured to acquire air-interface protocol layers to be used for the data transmission with the opposite communication end and functions of the respective air-interface protocol layers.

In a possible embodiment of the present disclosure, the air-interface protocol layer may at least include at least one of a PDCP layer, an RLC layer and an MAC layer. The PDCP layer may include a header compression function and an encryption function. The RLC layer may include a segmentation function and a cascading function. The MAC layer may include a multiplexing function.

In a possible embodiment of the present disclosure, the air-interface protocol stack acquisition module is further configured to acquire a hierarchical relationship among the air-interface protocol layers.

In a possible embodiment of the present disclosure, the air-interface protocol stack acquisition module is further configured to: configure the air-interface protocol stack to be used for the data transmission with the opposite communication end; or receive configuration information or identification information about the air-interface protocol stack to be used for the data transmission with the opposite communication end, and acquire the air-interface protocol stack to be used for the data transmission with the opposite communication end in accordance with the configuration information or identification information. The configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In a possible embodiment of the present disclosure, the air-interface protocol stack acquisition module is further configured to: acquire the air-interface protocol stack to be used for the data transmission with an opposite communication end at a specific region; or acquire the air-interface protocol stack to be used for the data transmission with a specific communication end; or acquire the air-interface protocol stack to be used for the data transmission with the opposite communication end in accordance with the data transmission characteristics reported by the opposite communication end; or select the air-interface protocol stack to be used for the data transmission with the opposite communication end from a plurality of predetermined air-interface protocol stacks in accordance with a correspondence between predetermined data transmission characteristics and air-interface protocol stack configurations.

In a possible embodiment of the present disclosure, the data transmission device further includes an air-interface protocol stack notification module configured to transmit the acquired configuration information or identification information about the air-interface protocol stack to the opposite communication end. The configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

Figure 14:
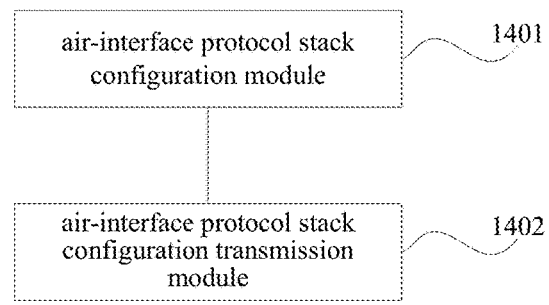
FIG. 14 is a schematic view showing an air-interface protocol stack configuration device according to one embodiment of the present disclosure.

Based on an identical inventive concept, the present disclosure provides in some embodiments an air-interface protocol stack configuration device which, as shown in FIG. 14, includes: an air-interface protocol stack configuration module 1401 configured to configure an air-interface protocol stack to be used for data transmission in accordance with data transmission characteristics of communication ends for the data transmission; and an air-interface protocol stack configuration transmission module 1402 configured to transmit configuration information or identification information about the air-interface protocol stack to at least one of the communication ends for the data transmission.

In a possible embodiment of the present disclosure, the data transmission characteristics of the communication ends for the data transmission include parts or all of the followings: a service type of the data transmission, a data volume type of the data transmission, a type of at least one of the communication ends for the data transmission, a capability of at least one of the communication ends for the data transmission, and an application scenario of the data transmission.

In a possible embodiment of the present disclosure, the air-interface protocol stack configuration module is configured to: configure, for a communication end at a specific region, the air-interface protocol stack to be used for the data transmission in accordance with the data transmission characteristics of the communication ends for the data transmission; or configure, for a specific communication end, the air-interface protocol stack to be used for the data transmission in accordance with the data transmission characteristics of the communication ends for the data transmission; or configure the air-interface protocol stack to be used for the data transmission in accordance with the data transmission characteristics reported by at least one of the communication ends for the data transmission; or select an air-interface protocol stack from a plurality of predetermined air-interface protocol stacks as the air-interface protocol stack to be used for the data transmission in accordance with a correspondence between predetermined data transmission characteristics and air-interface protocol stack configurations.

In a possible embodiment of the present disclosure, the air-interface protocol stack configuration module is configured to configure air-interface protocol layers to be used for the data transmission and/or functions of the respective air-interface protocol layers in accordance with the data transmission characteristics of the communication ends for the data transmission.

In a possible embodiment of the present disclosure, the air-interface protocol layer may at least include at least one of a PDCP layer, an RLC layer and an MAC layer. The PDCP layer may include a header compression function and an encryption function. The RLC layer may include a segmentation function and a cascading function. The MAC layer may include a multiplexing function.

In a possible embodiment of the present disclosure is further configured to configure a hierarchical relationship among the air-interface protocol layers.

In a possible embodiment of the present disclosure, the configuration information about the air-interface protocol stack includes: configuration information about the air-interface protocol layers to be used for the data transmission with an opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

Figure 15:
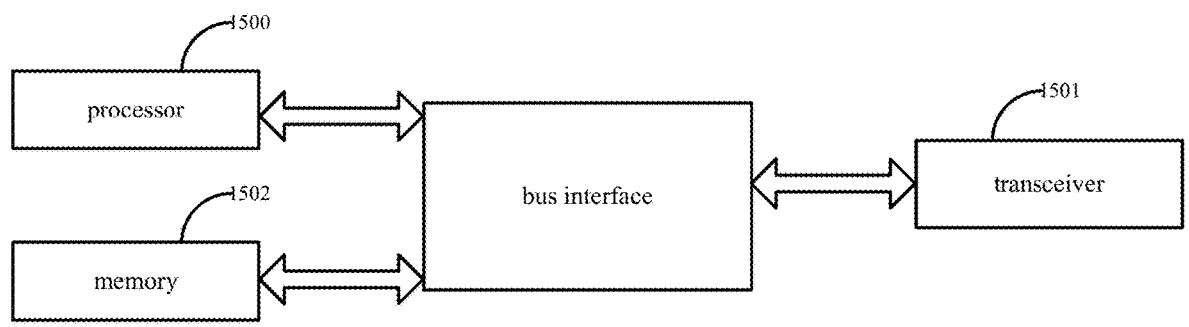
FIG. 15 is a schematic view showing a base station according to one embodiment of the present disclosure.

Based on an identical inventive concept, the present disclosure further provides in some embodiments a base station which, as shown in FIG. 15, includes a processor 1500, a transceiver 1501 and a memory 1502. The processor 1500 is configured to read a program stored in the memory 1502, so as to: acquire an air-interface protocol stack to be used for data transmission with an opposite communication end, the air-interface protocol stack being configured in accordance with data transmission characteristics for the data transmission with the opposite communication end; and perform the data transmission, through the transceiver 1501, with the opposite communication end in accordance with the air-interface protocol stack. The transceiver 1501 is configured to receive and transmit data under the control of the processor. The memory 1502 is configured to store therein data used for the operation of the processor.

In FIG. 15, bus architecture may include a number of buses and bridges connected to each other, so as to connect various circuits for one or more processors 1500 and one or more memories 1502. In addition, as is known in the art, the bus architecture may be used to connect any other circuits, such as a circuit for a peripheral device, a circuit for a voltage stabilizer and a power management circuit. Bus interfaces are provided, and the transceiver 1501 may consist of a plurality of elements, i.e., a transmitter and a receiver for communication with any other devices over a transmission medium. The processor 1500 may take charge of managing the bus architecture as well as general processings. The memory 1502 may store data desired for the operation of the processor 1500.

In a possible embodiment of the present disclosure, the data transmission characteristics for the data transmission with the opposite communication end includes parts or all of the followings: a service type of the data transmission with the opposite communication end, a data volume type of the data transmission with the opposite communication end, a type of the opposite communication end, a type of the data transmission device, a capability of the opposite communication end, a capability of the data transmission device, and an application scenario of the data transmission with the opposite communication end.

In a possible embodiment of the present disclosure, in the case of acquiring the air-interface protocol stack to be used for the data transmission with the opposite communication end, the processor is further configured to read the program stored in the memory, so as to acquire air-interface protocol layers to be used for the data transmission with the opposite communication end and functions of the respective air-interface protocol layers.

In a possible embodiment of the present disclosure, the air-interface protocol layer may at least include at least one of a PDCP layer, an RLC layer and an MAC layer. The PDCP layer may include a header compression function and an encryption function. The RLC layer may include a segmentation function and a cascading function. The MAC layer may include a multiplexing function.

In a possible embodiment of the present disclosure, in the case of acquiring the air-interface protocol stack to be used for the data transmission with the opposite communication end, the processor is further configured to read the program stored in the memory, so as to acquire a hierarchical relationship among the air-interface protocol layers.

In a possible embodiment of the present disclosure, the processor is further configured to: configure the air-interface protocol stack to be used for the data transmission with the opposite communication end; or receive configuration information or identification information about the air-interface protocol stack to be used for the data transmission with the opposite communication end, and acquire the air-interface protocol stack to be used for the data transmission with the opposite communication end in accordance with the configuration information or identification information. The configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In a possible embodiment of the present disclosure, the processor is further configured to acquire the air-interface protocol stack to be used for the data transmission with the opposite communication end at a specific region, or acquire the air-interface protocol stack to be used for the data transmission with a specific opposite communication end.

In a possible embodiment of the present disclosure, the processor is further configured to read the program stored in the memory, so as to transmit the acquired configuration information or identification information about the air-interface protocol stack to the opposite communication end. The configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

Figure 16:
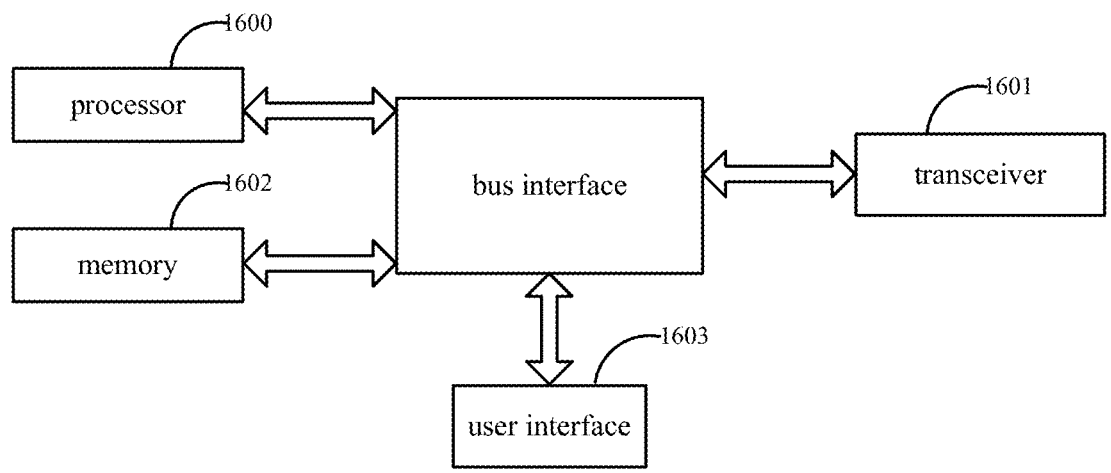
FIG. 16 is a schematic view showing a terminal according to one embodiment of the present disclosure.

Based on an identical inventive concept, the present disclosure further provides in some embodiments a terminal which, as shown in FIG. 16, includes a processor 1600, a transceiver 1601 and a memory 1602. The processor 1600 is configured to read a program stored in the memory 1602, so as to: acquire an air-interface protocol stack to be used for data transmission with an opposite communication end, the air-interface protocol stack being configured in accordance with data transmission characteristics for the data transmission with the opposite communication end; and perform the data transmission, through the transceiver 1601, with the opposite communication end in accordance with the air-interface protocol stack. The transceiver 1601 is configured to receive and transmit data under the control of the processor 1600. The memory 1602 is configured to store therein data used for the operation of the processor.

In FIG. 16, bus architecture may include a number of buses and bridges connected to each other, so as to connect various circuits for one or more processors 1600 and one or more memories 1602. In addition, as is known in the art, the bus architecture may be used to connect any other circuits, such as a circuit for a peripheral device, a circuit for a voltage stabilizer and a power management circuit. Bus interfaces are provided, and the transceiver 1601 may consist of a plurality of elements, i.e., a transmitter and a receiver for communication with any other devices over a transmission medium. With respect to different UEs, a user interface 1603 may also be provided for devices which are to be arranged inside or outside the UE, and these devices may include but not limited to a keypad, a display, a speaker, a microphone and a joystick. The processor 1600 may take charge of managing the bus architecture as well as general processings. The memory 1602 may store therein data for the operation of the processor 1600.

In a possible embodiment of the present disclosure, the data transmission characteristics for the data transmission with the opposite communication end includes parts or all of the followings: a service type of the data transmission with the opposite communication end, a data volume type of the data transmission with the opposite communication end, a type of the opposite communication end, a type of the terminal, a capability of the opposite communication end, a capability of the terminal, and an application scenario of the data transmission with the opposite communication end.

In a possible embodiment of the present disclosure, in the case of acquiring the air-interface protocol stack to be used for the data transmission with the opposite communication end, the processor is further configured to read the program stored in the memory, so as to acquire air-interface protocol layers to be used for the data transmission with the opposite communication end and functions of the respective air-interface protocol layers.

In a possible embodiment of the present disclosure, the air-interface protocol layer may at least include at least one of a PDCP layer, an RLC layer and an MAC layer. The PDCP layer may include a header compression function and an encryption function. The RLC layer may include a segmentation function and a cascading function. The MAC layer may include a multiplexing function.

In a possible embodiment of the present disclosure, in the case of acquiring the air-interface protocol stack to be used for the data transmission with the opposite communication end, the processor is further configured to read the program stored in the memory, so as to acquire a hierarchical relationship among the air-interface protocol layers.

In a possible embodiment of the present disclosure, the processor is further configured to receive configuration information or identification information about the air-interface protocol stack to be used for the data transmission with the opposite communication end, and acquire the air-interface protocol stack to be used for the data transmission with the opposite communication end in accordance with the configuration information or identification information. The configuration information about the air-interface protocol stack includes: configuration information about the air-interface protocol layers to be used for the data transmission with the opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

Figure 17:
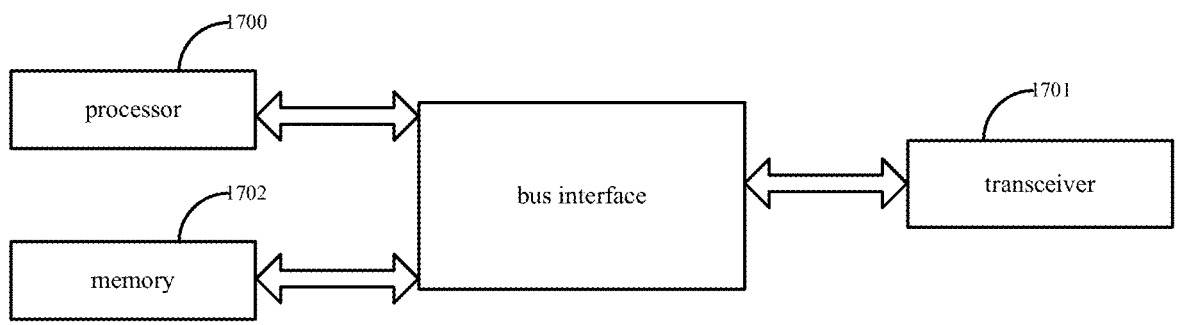
FIG. 17 is another schematic view showing the air-interface protocol stack configuration device according to one embodiment of the present disclosure.

Based on an identical inventive concept, the present disclosure further provides in some embodiments an air-interface protocol stack configuration device which, as shown in FIG. 17, includes a processor 1700, a transceiver 1701 and a memory 1702. The processor 1700 is configured to read a program stored in the memory 1702, so as to: configure an air-interface protocol stack to be used for data transmission in accordance with data transmission characteristics of communication ends for the data transmission; and transmit, through the transceiver 1701, configuration information or identification information about the air-interface protocol stack to at least one of the communication ends for the data transmission. The transceiver 1701 is configured to receive and transmit data under the control of the processor 1700. The memory 1702 is configured to store therein data used for the operation of the processor 1700.

In FIG. 17, bus architecture may include a number of buses and bridges connected to each other, so as to connect various circuits for one or more processors 1700 and one or more memories 1702. In addition, as is known in the art, the bus architecture may be used to connect any other circuits, such as a circuit for a peripheral device, a circuit for a voltage stabilizer and a power management circuit. Bus interfaces are provided, and the transceiver 1701 may consist of a plurality of elements, i.e., a transmitter and a receiver for communication with any other devices over a transmission medium. The processor 1700 may take charge of managing the bus architecture as well as general processings. The memory 1702 may store data desired for the operation of the processor 1700.

In a possible embodiment of the present disclosure, the data transmission characteristics of the communication ends for the data transmission include parts or all of the followings: a service type of the data transmission, a data volume type of the data transmission, a type of at least one of the communication ends for the data transmission, a capability of at least one of the communication ends for the data transmission, and an application scenario of the data transmission.

In a possible embodiment of the present disclosure, in the case of configuring the air-interface protocol stack to be used for the data transmission, the processor is further configured to read the program stored in the memory, so as to configure air-interface protocol layers to be used for the data transmission and/or functions of the respective air-interface protocol layers in accordance with the data transmission characteristics of the communication ends for the data transmission.

In a possible embodiment of the present disclosure, the air-interface protocol layer may at least include at least one of a PDCP layer, an RLC layer and an MAC layer. The PDCP layer may include a header compression function and an encryption function. The RLC layer may include a segmentation function and a cascading function. The MAC layer may include a multiplexing function.

In a possible embodiment of the present disclosure, the processor is further configured to read the program stored in the memory, so as to configure a hierarchical relationship among the air-interface protocol layers.

In a possible embodiment of the present disclosure, the configuration information about the air-interface protocol stack includes: configuration information about the air-interface protocol layers to be used for the data transmission with an opposite communication end; or the configuration information about the air-interface protocol layers to be used for the data transmission with the opposite communication end and configuration information about the functions of the respective air-interface protocol layers; or the configuration information about the air-interface protocol layers to be used for the data transmission with the opposite communication end, the configuration information about the functions of the respective air-interface protocol layers, and configuration information about a hierarchical relationship among the air-interface protocol layers.

In the embodiments of the present disclosure, the air-interface protocol stack configuration device may be a core network device, a base station or a decision node in a self-organizing network.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for configuring an air-interface protocol stack, comprising:
   configuring the air-interface protocol stack for data transmission in accordance with data transmission characteristics of communication ends for the data transmission; and
   transmitting configuration information about the air-interface protocol stack to at least one of the communication ends for the data transmission,
   wherein,
   the air-interface protocol stack is a new air-interface protocol stack consisting of one new air-interface protocol layer, the configuration information comprises configuration information of the one new air-interface protocol layer and configuration information of a function of the one new air-interface protocol layer, the function of the one new air-interface protocol layer comprises one or more of a data packet concatenation function, a header encryption function and a multiplexing function; or
   the air-interface protocol stack is a new air-interface protocol stack consisting of at least two new air-interface protocol layers, the configuration information comprises configuration information of each of the at least two new air-interface protocol layers, configuration information of functions of the at least two new air-interface protocol layers, and configuration information of a hierarchical relationship of the at least two new air-interface protocol layers, the functions of the at least two new air-interface protocol layers comprise one or more of a data packet concatenation function, a header encryption function and a multiplexing function,
   wherein the configuring the air-interface protocol stack for the data transmission in accordance with the data transmission characteristics of the communication ends for the data transmission comprises:
   configuring the air-interface protocol stack for the data transmission in accordance with the data transmission characteristics reported by at least one of the communication ends for the data transmission; and
   selecting the air-interface protocol stack from a plurality of predetermined air-interface protocol stacks as the air-interface protocol stack for the data transmission in accordance with a correspondence between predetermined data transmission characteristics and air-interface protocol stack configurations.

2. The method according to claim 1, wherein the data transmission characteristics of the communication ends for the data transmission comprise at least one of the followings: a service type of the data transmission, a type of at least one of the communication ends for the data transmission, a capability of at least one of the communication ends for the data transmission, or an application scenario of the data transmission.

3. The method for configuring the air-interface protocol stack according to claim 1, wherein at least one of following (i), (ii), or (iii):
   (i) the one new air-interface protocol layer or each of the at least two new air-interface protocol layers is different from at least one of a PDCP layer, an RLC layer, or a MAC layer in LTE,
   (ii) the function of the one new air-interface protocol layer or each of the functions of the at least two new air-interface layers is different from a function of at least one of a PDCP layer, an RLC layer, or a MAC layer in LTE,
   (iii) the hierarchical relationship of the at least two new air-interface protocol layers is different from a hierarchical relationship of at least two of a PDCP layer, an RLC layer, or a MAC layer in LTE.

4. The method according to claim 1, wherein the configuring the air-interface protocol stack for the data transmission in accordance with the data transmission characteristics of the communication ends for the data transmission further comprises:
   configuring, for a communication end at a specific region, the air-interface protocol stack for the data transmission in accordance with the data transmission characteristics of the communication ends for the data transmission; or
   configuring, for a specific communication end, the air-interface protocol stack for the data transmission in accordance with the data transmission characteristics of the communication ends for the data transmission.

5. A data communication method, comprising:
   receiving configuration information about an air-interface protocol stack for data transmission with an opposite communication end;
   acquiring the air-interface protocol stack based on the configuration information about the air-interface protocol stack, the air-interface protocol stack being configured in accordance with data transmission characteristics for the data transmission with the opposite communication end; and
   performing the data transmission with the opposite communication end in accordance with the air-interface protocol stack,
   wherein,
   the air-interface protocol stack is a new air-interface protocol stack consisting of one new air-interface protocol layer, the configuration information comprises configuration information of the one new air-interface protocol layer and configuration information of a function of the one new air-interface protocol layer, the function of the one new air-interface protocol layer comprises one or more of a data packet concatenation function, a header encryption function and a multiplexing function; or
   the air-interface protocol stack is a new air-interface protocol stack consisting of at least two new air-interface protocol layers, the configuration information comprises configuration information of each of the at least two new air-interface protocol layers, configuration information of functions of the at least two new air-interface protocol layers, and configuration information of a hierarchical relationship of the at least two new air-interface protocol layers, the functions of the at least two new air-interface protocol layers comprise one or more of a data packet concatenation function, a header encryption function and a multiplexing function, wherein the acquiring the air-interface protocol stack based on the configuration information about the air-interface protocol stack, comprises:
- acquiring the air-interface protocol stack for the data transmission with the opposite communication end in accordance with the data transmission characteristics reported by the opposite communication end; and
- selecting the air-interface protocol stack for the data transmission with the opposite communication end from a plurality of predetermined air-interface protocol stacks in accordance with a correspondence between predetermined data transmission characteristics and air-interface protocol stack configurations.

6. The data communication method according to claim 5, wherein the data transmission characteristics for the data transmission with the opposite communication end comprises at least one of the followings: a service type of the data transmission with the opposite communication end, a type of the opposite communication end, a type of a current device, a capability of the opposite communication end, a capability of the current device, or an application scenario of the data transmission with the opposite communication end.

7. The data communication method according to claim 5, wherein at least one of following (i), (ii), or (iii):
  (i) the one new air-interface protocol layer or each of the at least two new air-interface protocol layers is different from at least one of a PDCP layer, an RLC layer, or a MAC layer in LTE,
  (ii) the function of the one new air-interface protocol layer or each of the functions of the at least two new air-interface layers is different from a function of at least one of a PDCP layer, an RLC layer, or a MAC layer in LTE,
  (iii) the hierarchical relationship of the at least two new air-interface protocol layers is different from a hierarchical relationship of at least two of a PDCP layer, an RLC layer, or a MAC layer in LTE.

8. The data transmission method according to claim 5, wherein the acquiring the air-interface protocol stack based on the configuration information about the air-interface protocol stack further comprises:
- acquiring the air-interface protocol stack for the data transmission with the opposite communication end at a specific region; or
- acquiring the air-interface protocol stack for the data transmission with a specific communication end.

9. A data communication device, comprising:
a processor, a transceiver and a memory, wherein
the processor is configured to read a program stored in the memory, so as to: receive, through the transceiver, configuration information about an air-interface protocol stack for data transmission with an opposite communication end, acquire the air-interface protocol stack based on the configuration information about the air-interface protocol stack, the air-interface protocol stack being configured in accordance with data transmission characteristics for the data transmission with the opposite communication end; and perform, through the transceiver, the data transmission with the opposite communication end in accordance with the air-interface protocol stack,
the transceiver is configured to receive and transmit data, and
the memory is configured to store therein data for the operation of the processor,
wherein,
the air-interface protocol stack is a new air-interface protocol stack consisting of one new air-interface protocol layer, the configuration information comprises configuration information of the one new air-interface protocol layer and configuration information of a function of the one new air-interface protocol layer, the function of the one new air-interface protocol layer comprises one or more of a data packet concatenation function, a header encryption function and a multiplexing function; or
the air-interface protocol stack is a new air-interface protocol stack consisting of at least two new air-interface protocol layers, the configuration information comprises configuration information of each of the at least two new air-interface protocol layers, configuration information of functions of the at least two new air-interface protocol layers, and configuration information of a hierarchical relationship of the at least two new air-interface protocol layers, the functions of the at least two new air-interface protocol layers comprise one or more of a data packet concatenation function, a header encryption function and a multiplexing function,
the processor is further configured to read the program stored in the memory, so as to:
- acquire the air-interface protocol stack for the data transmission with the opposite communication end in accordance with the data transmission characteristics reported by the opposite communication end; and
- select the air-interface protocol stack for the data transmission with the opposite communication end from a plurality of predetermined air-interface protocol stacks in accordance with a correspondence between predetermined data transmission characteristics and air-interface protocol stack configurations.

10. The data communication device according to claim 9, wherein the data transmission characteristics for the data transmission with the opposite communication end comprises at least one of the followings: a service type of the data transmission with the opposite communication end, a type of the opposite communication end, a type of the data transmission device, a capability of the opposite communication end, a capability of the data transmission device, or an application scenario of the data transmission with the opposite communication end.

11. The data communication device according to claim 9, wherein, at least one of following (i), (ii), or (iii):
  (i) the one new air-interface protocol layer or each of the at least two new air-interface protocol layers is different from at least one of a PDCP layer, an RLC layer, or a MAC layer in LTE,
  (ii) the function of the one new air-interface protocol layer or each of the functions of the at least two new air-interface layers is different from a function of at least one of a PDCP layer, an RLC layer, or a MAC layer in LTE,
  (iii) the hierarchical relationship of the at least two new air-interface protocol layers is different from a hierarchical relationship of at least two of a PDCP layer, an RLC layer, or a MAC layer in LTE.

12. The data transmission device according to claim 9, wherein the processor is further configured to:
- acquire the air-interface protocol stack for the data transmission with the opposite communication end at a specific region; or acquire the air-interface protocol stack for the data transmission with a specific communication end.

* * * * *